IMAGE MOTION DETECTOR AND STABILIZER

Filed Jan. 30, 1967 6 Sheets-Sheet 1

Murray J. Hillman,
INVENTOR.
BY.

GOLOVE & KLEINBERG,
ATTORNEYS.

1

3,500,050
IMAGE MOTION DETECTOR AND STABILIZER
Murray J. Hillman, West Covina, Calif., assignor to Hycon Mfg. Company, Monrovia, Calif.
Filed Jan. 30, 1967, Ser. No. 612,448
Int. Cl. H01j 39/12
U.S. Cl. 250—214 46 Claims

ABSTRACT OF THE DISCLOSURE

Apparatus for detecting the velocity of unstabilized optical images, for extracting related information therefrom, and for stabilizing optical images. An image signal is heterodyned with a high frequency carrier signal corresponding to a generated reference signal, and an electrical signal representative of image velocity is consequently generated through phase lock techniques, whereby the rate of phase variation of the heterodyned signal is compared to the phase of the reference signal. The resulting image velocity signal may be utilized in a servo loop for image stabilization, for driving image motion compensation apparatus, and for supplying information for application in aeronautical navigation.

This invention relates to apparatus for detecting the velocity of unstabilized optical images, for stabilizing optical images, and for analyzing image velocity for the extraction of information for application in aeronautical navigation.

The present invention finds particular application with respect to aerial camera image stabilization, and for providing a compensating signal to image motion compensation systems of aerial cameras for synchronizing camera film motion with image motion during film exposure intervals, and will be described with particular reference to such systems. Additionally, other applications which utilize image velocity data, such as in aeronautical navigation, are included within the scope of the present invention.

In aerial photography, various conditions are presented which produce movement of the camera image over the film surface. In order that the photograph of the image will not be blurred because of such image motion or image instability, provision must be made to compensate for the image motion with respect to the film during exposure intervals. This can be accomplished either by stabilizing the image or by synchronizing film velocity with image velocity during film exposure.

The various conditions contributing to image instability (when photographing the earth's surface from a camera attached to a moving aircraft) include, for example, the fact that the image at the focal plane is continually changed due to the relative movement of the camera and the earth's surface. Aircraft perturbations, particularly those affecting fore-and-aft image motion (such as pitch), contribute to image instability. In addition, local disturbances such as aircraft mechanical disturbances and vibration of moving parts internal to the camera, may affect the optical system of the camera to provide varying degrees of image instability.

In order to isolate the camera from the aircraft perturbations and other local disturbances, the camera may be mounted on a platform which maintains a predetermined orientation in inertial space. For example, a system of gyroscopes may be mounted on the platform to provide the necessary angular motion sensing of disturbances which are transmitted to the platform through rotation of the aircraft and by other mechanical disturbances to the platform. Transducers on the gyro precession axes provide signals in response to disturbance torques about the gyro spin axes, and these signals are then used to produce counteracting torques about the appropriate gimbal axis in order to maintain stabilization of the platform. Torque motors, or "torquers," are provided to apply the stabilizing torques to the gimbals.

2

Torquer requirements become quite severe when the torquer is required to produce high variable precession velocities in inertial space. Although the present state-of-the-art torquers are adequate to maintain platform stabilization under usual conditions of flight, there nevertheless exist torquing errors when it is necessary to counteract extraordinary disturbances to the platform. Although such errors in platform stabilization may be slight, they nevertheless cause disturbances to the camera which may tend to destabilize the image.

The great expense attendant high quality platforms may make their use uneconomical in many applications. As a result, less expensive (and hence lower quality) platforms are often used, resulting in an inability to compensate for many of the aircraft perturbations. Under such circumstances, a camera image will necessarily be unstable. The apparatus of the present invention compenstes for this image instability caused by the uncompensated aircraft perturbations. Furthermore, the extremely short response time which characterizes the apparatus of the present invention makes the requirement of a stabilized platform unnecessary so far as image stability is concerned.

In addition to the effect of uncompensated aircraft perturbations, image instability may arise from disturbances to the camera optical system due to vibration of mechanical parts within the camera. Such vibrations arise from a variety of sources, such as from the film transport apparatus, image motion compensation apparatus, automatic focusing apparatus, and shutter mechanisms. In cameras equipped with a rotatable mirror located in the optical path between the camera lens and ground (to compensate for image motion arising from aircraft velocity), these internal disturbances (as well as aircraft disturbances transmitted to the camera) may cause the mirror to vibrate, particularly about its axis of rotation. Similarly, in a camera equipped with a moving platen (to compensate for image motion arising from aircraft velocity), such disturbances may cause the platen to vibrate with respect to the image projected thereon. A vibrating mirror or a vibrating platen produces image instability, and if provision is not made to stabilize the image during the exposure interval of the film, the resultant photograph of the image will be blurred.

A third cause of image instability in aerial photography arises from the fact that the aerial camera is moving with respect to its ground target, at the aircraft velocity. This condition causes the image at the focal plane of the camera to continually change, or move, due to the relative movement of the camera and the earth's surface. This type of image motion is opposite in direction to aircraft velocity, and the image moves over the camera focal plane at a speed which is a predetermined function of the velocity of the aircraft, its height above ground, and the camera lens focal length.

Various image motion compensation devices have been employed in combination with aerial cameras, for image stabilization with respect to the "moving" ground. For example, the film format may be translated during the exposure interval with a velocity corresponding to the image velocity over the focal plane. This may be accomplished by either moving the film over the camera platen during this time, or by moving the camera platen upon which the film format has been temporarily adhered.

Alternatively, the entire camera may be rotated during the exposure interval to provide image motion compensation. Still other image motion compensation arrangements cause controlled rotation of a mirror, located in the optical path between the camera lens and the ground target, to stabilize the image at the film plane.

Regardless of the method employed for providing image motion compensation, the compensating device must be commanded to move at the desired compensating velocity. Accordingly, the image motion compensation mechanisms may be pre-set prior to a photographic mission flown at a particular velocity and altitude.

For greater versatility, and particularly during reconnaissance missions where it would be impractical to comply with prearranged conditions of velocity and altitude, the camera is equipped with a mechanism for controlling the image motion compensation system during flight conditions in accordance with a signal representative of image velocity. Alternatively, compensation can be provided by a continual sampling of the image velocity, which data is applied to the image for its stabilization.

According to a preferred embodiment of the present invention, apparatus is provided for stabilizing an otherwise unstabilized image. Such stabilization is accomplished regardless of the sources of instability; for example, whether the unstabilizing source is provided by the optical system, by aircraft perturbations, or by a relatively moving target. In this preferred embodiment, a rotatable mirror positioned between the camera lens and the ground is commanded to rotate in such a manner as to render the image stationary. According to an alternative embodiment of the present invention, stabilization is accomplished by providing compensating movements of the camera platen.

Since certain directions are more important than others for image stablization, the apparatus may be responsive only to selected directions. For example, in aerial photography, variations in pitch have greater effect upon image instability than have variations in roll. Apparatus may be provided for stabilizing the image with respect to selected directions, or alternatively, to all directions.

According to a second alternative embodiment of the present invention, apparatus is provided for detecting image velocity parallel to selected components of image instability. For example, image motion detector apparatus may be positioned in an aircraft such that it senses the component of image instability parallel to aircraft velocity with respect to the ground. The apparatus generates an electrical signal which is proportional to and representative of the selected component of image velocity, and it may therefore be used to control image motion compensation devices of aerial cameras. Furthermore, a fourth alternative embodiment of the present invention generates two electrical signals, each of which is proportional to and representative of a different component of image velocity. Such apparatus may be used to control image motion compensation devices of aerial cameras for providing image compensation in all directions. In addition, the dual signals may be utilized for navigational purposes, such as drift compensation.

The present invention is characterized by apparatus for extracting information concerning image instability from an image with great precision within an extremely short processing time. It is a well known phenomenon that if an image moves over a grid, or a plate having alternate transparent and opaque bands transverse to the direction of instability, optical signals will be produced which have a frequency proportional to image velocity. As applied to image motion compensation parallel to aircraft, for example, the alternating opaque and transparent bands are situtated in a direction transverse to the direction of aircraft flight, so that an image of the relatively moving ground target is projected upon the plate and traverses the bands parallel to the direction of flight. The optical signals thereby produced will have a frequency proportional to the image velocity, and may impinge upon a photoelectric device to produce an electrical signal having a temporal frequency proportional to image velocity.

In prior art image velocity sensors utilizing the above described apparatus, the electrical signals which are produced are characterized by very low frequencies, often less than one cycle per second. The continually changing patterns of light and dark in the image, caused by size variations of the "moving" objects within the target, present variations in the temporal frequency from cycle to cycle, so that the variation in frequency must be averaged over many cycles to provide a mean frequency which is accurately representative of image velocity. The more cycles used in the averaging process, of course, the closer this mean frequency will approach a value accurately representative of image velocity. It can be seen that, in the apparatus described above, several seconds will be required to provide a mean frequency determined over only a few cycles.

By the present invention, it has been found that if the bands are caused to move parallel to the direction of image motion, many cycles of the temporal frequency will be available for processing in a very short period of time. For example, if the grid is moving at 10,000 cycles per second without the contribution of image motion and the contribution due to image motion is one cycle per second, the resultant signal will have a frequency of 9,999 cycles per second or 10,001 cycles per second, depending upon whether the image is moving the same direction as the grid or opposite thereto, respectively, Accordingly, a complete cycle will be generated in approximately 100 microseconds. The rapidly moving grid may be considered to be a time compressor with respect to the image velocity, and the great increase in frequency attendant thereto makes available a greatly increased number of cycles in a short period of time.

It is evident that this composite signal contains a constant frequency carrier component corresponding to the velocity of the grid, in addition to a component corresponding to instantaneous image velocity. The independent velocity of the grid has in effect supplied a new reference to the temporal frequency of the image, and at some time during the processing of the composite signal, the reference frequency must be related to the composite signal in order to generate a signal having a frequency corresponding only to image velocity and being independent of grid velocity.

The establishment of the reference frequency may be provided by generating an electrical signal having a frequency corresponding to the rate at which the image would be interrupted if the image were stabilized. Apparatus according to the present invention generates a reference signal having the required carrier frequency, by providing a stationary light source and a photoelectric device with the moving grid interposed therebetween. An electrical reference signal is therefore produced having a frequency corresponding only to the velocity of the grid.

For example, the grid may comprise a transparent or translucent disc having opaque sectors contained thereon, so that the disc contains alternating opaque and transparent (or translucent) sectors. A stationary light source is provided, the flux of which is projected onto a portion of the surface of the disc. The disc is adapted to rotate and the light source passes through the transparent sectors of the disc, producing an optical signal having a frequency dependent upon the velocity of the disc rotation and the total number of transparent sectors. This optical signal is received by a first photoelectric device, such as a phototransistor or a photomultiplier, to transduce the optical signal into an electrical reference signal having frequency identical to the carrier frequency.

The composite signal having frequency components corresponding to the grid velocity and the image velocity, is generated by projecting the image upon the disc surface so that the image is interrupted at the same rate that the flux from the reference light source is interrupted. A second photoelectric device is provided to receive the composite optical signal and to produce therefrom an electrical composite signal having the same frequency. It is evident that the composite signal is referenced to the reference signal, so that the reference signal may be considered to have a frequency descriptive of a stabilized image.

Describing the invention further, one of the signals is modified until its frequency is identical to that of the other signal. Means are therefore provided to alter the wavelength of the signal being modified, thereby altering its frequency until the wavelengths of the two signals are identical. This may be accomplished by phase modulating one of the signals in accordance with a modulating signal representative of the instantaneous difference in phase between the two signals, to provide frequency similarity.

In modifying one of the signals, either the optical signal or its corresponding electrical signal can be modified since changing one has the same effect as changing the other. In a preferred embodiment of the invention, the optical signal is modified by varying the velocity of the moving image in accordance with an error signal which is derived from a comparison of the composite signal with the reference signal, in effect modulating the phase of the electrical composite signal until its frequency is identical to that of the reference frequency. When this condition is maintained, the image is stabilized.

In other embodiments of the present invention, the electrical reference signal is modified by modulating its phase in accordance with an error signal which is derived from a comparison of the reference signal with the composite signal, until the frequency of the reference signal is identical to that of the composite signal. When this condition is maintained the apparatus provides an output signal having a magnitude proportional to the time rate of phase change of the reference signal. This output signal is a D.C. voltage proportional to and representative of the image velocity.

The present invention provides a substantial improvement over image stabilizers and image velocity detectors presently known in the art. In a patent to Brandon, No. 3,006,235, an image velocity detector is described which utilizes a rotating squirrel cage grid interposed in the projection of an image of ground terrain upon a photocell. The photocell output is an electrical signal having a frequency containing components representing the velocity of the grid and the image velocity.

The squirrel cage is driven by a first synchronous motor through a first system of gears. The photocell output is amplified and filtered by well known A.C. amplifying and filtering techniques, and is applied to a second synchronous motor. A third synchronous motor is driven by the same supply signal which drives the first synchronous motor, and the mechanical rotation of the second and third synchronous motors, through separate gear boxes, drive the input shafts of a mechanical differential. The differential output is a shaft rotation which is proportional to the difference between the outputs of the second and third synchronous motors. This output shaft rotation is purported to be proportional to image velocity.

The patent to Brandon is based upon the already stated phenomenon, well known to the art, that an image traversing a grid will produce optical signals having a frequency proportional to image velocity. In image velocity detectors utilizing a "stationary" grid, the very low frequencies which characterize the signals usually encountered present electrical and electronic problems in their amplification. Brandon teaches apparatus for avoiding this problem of amplication of low frequency signals by heterodyning the low frequency image signal with a second higher frequency signal, amplifying the heterodyned signal, providing a mechanical signal proportional to the heterodyned signal, and subtracting out a mechanical signal proportional to the frequency of the second signal. The characteristics of the wave forms of none of these signals are modified, and mixing of the high frequency second signals is employed solely as an aid to allow the use of ordinary amplification techniques.

In contrast to the present invention, the patent to Brandon does not teach the heterodyning of a low frequency image signal with a higher frequency signal for the collection of a greatly increased quantity of image velocity information with respect to time. Apparatus according to the patent to Brandon does not provide a time compressor with respect to the image velocity, to produce a greatly increased number of cycles for providing a very accurate mean image frequency signal. This is evident when it is considered that any increase in accuracy or decrease in processing time which may be provided by rapid grid velocity is offset by the inherent errors in mechanical systems.

For example, at the very high frequencies required to produce the accuracy and time response characteristics of apparatus according to the present invention, it would be impossible to maintain synchronous motors in synchronism with each other. The large amount of phase jitter in each of the synchronous motors at the required frequencies would introduce errors in all of the signals containing image velocity information, so that an increase in detector accuracy based upon a decrease in signal processing time would not materialize. Furthermore, the multitude of rotating shafts and gears produce errors in the output signal arising from such sources as torsional effects, slip, backlash and temperature effects.

Another problem inherent to the apparatus of the prior art, if decreased processing times were to be employed, concerns that of eccentricity of the squirrel cage grid employed in many prior art systems. For short processing times, the output signal would be modulated in accordance with a modulating frequency determined by the grid rotational velocity, and the amplitude of this eccentricity error is established by the eccentricity of the cage and its radius. In the prior art apparatus, there is no way of determining the amplitude of the eccentricity error nor is there any way of discarding its effects. The presence of an eccentricity error in the output signal is catastrophic to the utilization of a shortened processing time. It should be noted that the eccentricity error generated by the present invention, which preferably utilizes a rotating disc to generate both the image velocity information signal and the reference signal, may be discarded as discussed later.

It is apparent that the apparatus taught by prior art is not meant to operate with a signal having a frequency high enough to increase output signal accuracy by providing an artificial statistical reference, as in the present invention, but merely to add the low frequency image signal to another signal having a convenient frequency level in order to allow the utilization of available amplification apparatus.

It is an object of the present invention to provide apparatus for stabilizing an optical image.

It is another object of the present invention to provide apparatus for stabilizing an image parallel to selected directions.

It is a further object of the present invention to provide apparatus for use with an aerial camera for providing image motion compensation parallel to the aircraft line of flight, as well as for compensating for image instability contributed by vibrations to the optical system and by aircraft perturbations.

It is yet another object of the present invention to provide apparatus for use with an aerial camera for applying compensating movements to a pivoted mirror in order to stabilize the camera image.

It is a still further object of the present invention to provide apparatus for use with an aerial camera for providing compensating movements to the camera platen in order to stabilize the camera image over the surface of the platen.

It is another object of the present invention to provide apparatus for generating an electrical signal proportional to and representative of the velocity of an unstabilized image parallel to a selected direction.

It is yet another object of the present invention to provide apparatus for generating a plurality of electrical signals, each of which is proportional to and representative of the velocity of an unstabilized image in different selected directions.

It is a further object of the present invention to provide apparattus adapted to be carried in an aircraft for generating an electrical signal which is proportional to and representative of the velocity of an image of ground terrain in a selected direction.

It is another object of the present invention to provide apparatus for generating an electrical signal which may be utilized to control image motion compensation mechanisms of aerial cameras.

It is a still further object of the present invention to provide apparatus adapted to be carried in an aircraft for generating a plurality of electrical signals, each of which is proportional to and representative of the velocity of an image of ground terrain in different selected directions.

It is yet another object of the present invention to provide apparatus adapted to be carried in an aircraft for generating electrical signals which are proportional to and representative of the velocity of an image of ground terrain in different selected directions, for utilization as an aid to aeronautical navigation.

It is a further object of the present invention to provide apparatus for heterodyning an accurately controlled carrier signal with an optical signal containing image velocity information and for the extraction of the image velocity information.

It is yet another object of the present invention to provide apparatus for generating an electrical signal which is proportional to and very accurately representative of the velocity of an optical image and which is further characterized by extremely short processing and response time.

The novel features which are believed to be characteristic of the invention, together with further objects and advantages thereof will be better understood from the following description considered in connection with the accompanying drawings in which several embodiments of the invention are illustrated by way of example.

It is to be expressly understood, however, that the drawings are for the purpose of illustration and description only and are not intended as a definition of the limits of the invention.

Figure 1:
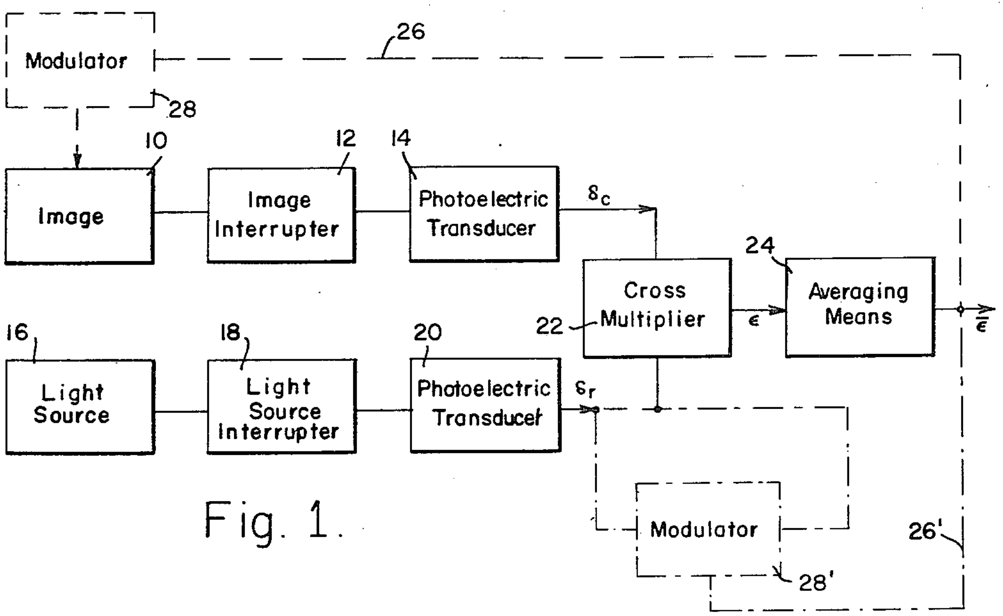
FIG. 1 is a block diagram of apparatus according to the present invention.

Turning first to FIG. 1, there is shown an image 10 exhibiting a velocity having components in two mutually perpendicular directions. An image interruptor 12 periodically interrupts the image parallel to its velocity direction, or alternatively, parallel to a selected component direction. For example, the image interruptor 12 may comprise a grid having alternate transparent and opaque bands transverse to the selected direction of instability, and adapted to move parallel to that direction, producing a plurality of optical signals having a composite frequency determined by the frequency of interruption of the image moving transverse to the bands of the moving grid. A first photoelectric transducer 14 receives these optical signals, and transduces them into an electrical composite signal $\delta_c$ having a corresponding frequency.

Flux originating from a stationary light source 16 is periodically interrupted by a light source interruptor 18 at the same interruption rate provided by the image interruptor 12. The light source interruptor 18 provides a plurality of optical signals having a reference frequency corresponding to the rate at which the image 10 would be interrupted by the image interruptor 12 if the image 10 were stabilized. A second photoelectric transducer 20 receives the optical signal from the light source interruptor 18, and transduces them into an electrical reference signal $\delta_r$ of corresponding frequency.

It may be appreciated that the frequency of image interruption provided by the image interruptor 12 establishes a carrier frequency which is hereterodyned with the image temporal frequency, producing a frequency deviation in the carrier corresponding to the image velocity component in the selected direction. This heterodyned frequency appears as the frequency of the electrical composite signal $\delta_c$, while the carrier frequency appears as the frequency of the electrical reference signal $\delta_r$.

The composite signal $\delta_c$ and the reference signal $\delta_r$ are thereupon applied as inputs to a phase controlled loop, which compares the phases of the composite signal $\delta_c$ and the reference signal $\delta_r$ and modifies one of these signals (either the composite signal $\delta_c$ or the reference signal $\delta_r$) until its frequency is identical to that of the unchanged signal. To accomplish this purpose, the composite signal $\delta_c$ and the reference signal $\delta_r$ are applied to a phase comparator, such as a cross-multiplier 22, for comparing the phases of the two input signals $\delta_c$, $\delta_r$, to generate an output signal $\epsilon$ which is the product of the two input signal wave forms. The cross-multiplier output signal $\epsilon$ is in fact a periodic function of the phase difference between the two input signals. An averaging means 24 is provided to produce an average value of the periodic cross-multiplier output signal $\epsilon$.

The averaging means output signal $\bar{\epsilon}$ is applied to a modulator for modifying either the composite signals $\delta$ or the reference signal $\delta_r$ in order to provide similarity of their frequencies. Alternate loops are indicated in FIG. 1, depending upon which signal is to be modified. If it is desired to modify the image signal, a first loop 26 is employed whereby the averaged cross-multiplier output signal $\bar{\epsilon}$ is applied to a first alternative modulator 28 for modulating the image 10. A second alternative loop 26' is provided for modulating the reference signal $\delta_r$ by means of a second alternative modulator 28'. The dashed line in FIG. 1 indicates the path taken when the image 10 is modulated, and the dotted line when the reference signal $\delta_r$ is modulated, while the solid line is common to both cases.

When either of the loops 26, 26' are closed, a minimum in the average value of the cross-multiplier product $\bar{\epsilon}$ is constantly being sought. This condition requires that one of the cross-multiplier input signals bear a specified phase relationship to the other cross-multiplier input signal. A phase difference of either 90° or 180° are commonly employed, depending upon the characteristic of the particular cross-multiplier employed. When this condition is obtained, the cross-multiplier input signals are brought into phase lock and their frequencies are identical.

Since the composite signal $\delta_c$ and the reference signal $\delta_r$ do not have identical frequencies, the average product signal $\bar{\epsilon}$ represents a correction which, when applied to either of the alternate modulators 28, 28' tends to pull the cross-multiplier input signals into phase lock and to maintain this condition. By continually modulating the phase of either the composite signal $\delta_c$ or the reference signal $\delta_r$ to maintain phase lock with the unchanged signal, frequency similarity is obtained between the two cross-multiplier input signals.

When frequency similarity and phase lock are maintained between the two cross-multiplier input signals, the average value of the cross-multiplier output $\bar{\epsilon}$ has a magnitude which represents the frequency deviation of the carrier, which corresponds to the image velocity component in the selected direction of image instability. This average signal $\bar{\epsilon}$ is therefore the image velocity analog.

By phase modulating the image 10 with respect to time, in accordance with the image velocity analog signal $\bar{\epsilon}$, the velocity of the image is changed. When the velocity of the image is modified to the extent required to phase modulate the composite signal $\delta_c$ until its frequency remains identical to the frequency of the reference signal $\delta_r$, the image will be stabilized. Image stabilization is maintained during this condition, since the frequency of the reference signal $\delta_r$ represents a non-moving image.

Alternatively, by phase modulating the reference signal $\delta_r$ without modifying the image velocity, the image velocity analog $\bar{\epsilon}$ is representative of true image motion. The time constant associated with the averaging means 24 is selected to optimize the loop tracking dynamics, to provide loop compensation. The averaging means 24 further helps to smooth out instantaneous inconsistencies inherent in any practical image. These inconsistencies result from the continually changing patterns of light and dark in the image, caused by the continually changing variations in the size and relative positions of the particles making up the image, and present variations in the temporal frequency attributed to the image from cycle to cycle. These variations produce corresponding variations in the frequency of the composite signal $\delta_c$, from cycle to cycle. If the periodic phase error signal $\epsilon$ were averaged only over each cycle, the image velocity analog $\bar{\epsilon}$ would exhibit deviations about a value representing the velocity of the complete image. By averaging the phase error signal $\epsilon$ over many cycles, the image velocity analog $\bar{\epsilon}$ represents a mean frequency of the image contribution which approaches a value accurately representative of the image velocity component parallel to the selected direction of velocity sensing. Since many cycles of the composite signals $\delta_c$ (and hence of the phase error signal $\epsilon$) are generated with a very short period of time, a very accurate means value of the image temporal frequency is obtained in a very short processing time. For example, when the reference signal $\delta_r$ has a frequency of 30,000 cycles per second, a complete cycle of the phase error signal $\epsilon$ is generated in approximately 34 microseconds. Although the number of cycles available for this purpose is restricted by the optimization of the loop tracking dynamics, a sufficient number is available to allow the image velocity analog $\bar{\epsilon}$ to approach this mean value.

Figure 2:
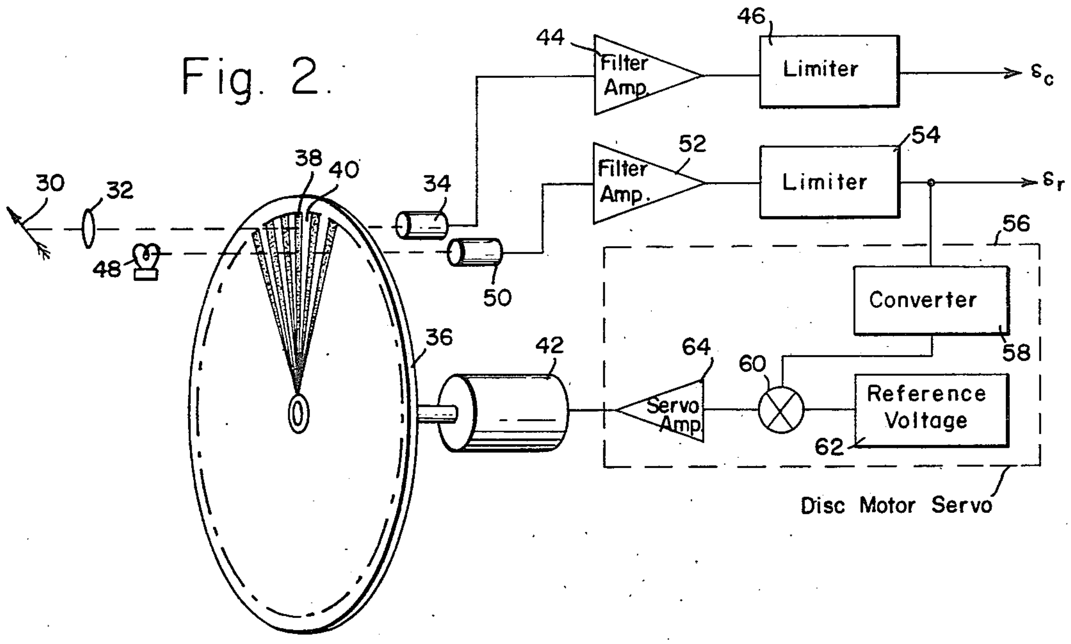
FIG. 2 is a block diagram, shown partly in perspective, of a preferred mechanization of apparatus according to the present invention, for generating a first electrical signal containing image velocity information and a second electrical signal for comparison thereto.

Turning now to FIG. 2, there is shown a preferred mechanization of apparatus according to the present invention for generating the electrical composite signal $\delta_c$ and the electrical reference signal $\delta_r$.

An image of a moving target 30 is projected by a lens 32 upon a photoelectric device, such as a first phototransistor 34. The target 30 can be a portion of "moving" terrain when the apparatus is carried by an aircraft. Alternatively, the target 30 can be a real or a virtual image, exhibiting instability along at least one direction.

A disc 36 is interposed in the projection of the image upon the first phototransistor 34, the disc 36 being comprised of a plurality of equal sectors of opaque material 38 and equal sectors of transparent (or translucent) material 40. The opaque sectors 38 and the transparent sectors 40 are preferably equal to each other, and are arranged such that an opaque sector 38 alternates with a transparent sector 40.

The disc 36 is adapted to rotate, and a motor 42 is provided for this purpose. The surface of the disc 36 is positioned substantially orthogonal to the image optical axis, and when the disc rotates, the sectors 38, 40 intercepting the image describe a moving grid with respect to the image. The direction of disc rotation and the position of the image with respect to the sectors are established so that the grid moves parallel to the selected component of image velocity.

In practice, an image of finite length intercepts several sectors of the disc 36. The length of the image is oriented such that the particles making up the image along the velocity component of interest move parallel to the image length. In an example of a preferred disc configuration, approximately 1,000 complete cycles of alternating opaque and transparent sectors 38, 40 are provided so that the image length may be positioned substantially perpendicular to the grid sectors. A suitable example of the image area positioned near the circumference of a two-inch diameter disc 36, which may be established by the insertion of a curtain having a slit between the lens 32 and the disc 36, has a width of 2° and a length of 10° when a one-inch focal length lens is employed. In this example, the image length intercepts twenty-eight opaque sectors 38 and twenty-eight transparent sectors 40.

The operation of the moving disc 36 may be exemplified by consideration of its interaction with one of the particles making up the image. As an image particle moves "with" a transparent sector 40, the first phototransistor 34 receives a first optical signal having a duration corresponding to the length of time that the moving image particle is positioned within the transparent sector 40, determined by the speed of the grid and the speed of the image particle. As the particle moves with the next transparent sector 40, a second optical signal is received by the first phototransistor 34, having a duration determined by the same parameters, separated in time by a corresponding interval as the image particle is interrupted by an intermediate opaque sector 38. Similarly, if the image particle moves in a direction opposite the grid velocity, the duration of the optical signals will be determined by the difference between the grid speed and the temporal speed of the image particle.

The light energy transmitted to the first phototransistor 34, of course, is determined by all of the particles making up the image and their interaction with the moving disc 36. If the image were stationary, the electrical signal provided by the phototransistor 34 would appear as a sinusoid having a frequency determined by the frequency with which the image is intercepted by both an opaque and a transparent sector 38, 40. When the preferred disc configuration is rotated at 30 revolutions per second, a stationary image would provide for the generation of a carrier signal having a frequency of 30,000 cycles per second. When the image is moving, however, the carrier frequency is modified in accordance with the velocity of the image, providing a frequency deviation of the carrier which is proportional to the image velocity. This frequency deviation corresponds to the temporal frequency which would be generated by the image moving over a stationary grid, and the electrical output of the first phototransistor 34 describes a sine wave having a frequency established by the heterodyning of the carrier frequency with the temporal image frequency.

As discussed earlier, in a practical application the variations in image contrast patterns provide variations in the temporal frequency of the image, and apparatus according to the present invention seeks to establish a mean value of the image frequency which is accurately proportional to overall image motion. By heterodyning the temporal low frequency image signal with the very high frequency carrier signal, both of which are simultaneously generated by the preferred image interruptor configuration, many cycles of the temporal frequency are effectively available for processing in a very short period of time. Furthermore, some averaging is provided at the surface of the disc 36, since the finite length of the image is intercepted by a plurality of opaque and transparent sectors 38, 40. The plurality of sectors intercepting the image length also tends to average the image velocity differences along the image length due to obliquity of the angle of view.

Because the image signal contains spurious or noise signals unrelated to image velocity, the output signal of the first phototransistor 34 is filtered by a first band-pass filter amplifier 44 which is tuned at the carrier frequency. Frequencies falling outside the tuned bands, having no relation to image velocity information are thereby eliminated from the phototransistor output signal, while the frequencies in the band around the carrier frequency are amplified.

In the further processing of this composite signal through the phase locked loop, according to the present invention, the image velocity information is extracted from the zero crossings of the sine wave. Since variations in the amplitude of the sine wave may represent loop gain variations which can adversely affect the operation of the phase controlled loop, it is important that the composite signal be uniformly limited. Consequently, the sine wave output from the filter amplifier 44 is limited by a first limiter 46, which is a standard zero-crossing detector, to produce a square wave of a uniform amplitude and having transition points which correspond to the zero crossings of the sine wave. The limiter output is therefore a nearly ideal square wave having a peak to peak amplitude which is standardized at a convenient voltage, for example 3 volts, and defines the composite signal $\delta_c$.

The carrier frequency is determined by the generation of a reference signal $\delta_r$. The flux originating from a stationary light source 48 is intercepted by the alternating opaque and transparent sectors 38, 40 of the disc 36, and the optical signals thereby produced are received by a second phototransistor 50. The electrical signal generated by the second phototransistor 50 is a sinusoid having a frequency determined by the rate of interruption of the flux provided by the stationary light source 48. This frequency corresponds to the rate at which the image would be interrupted by the rotation of the disc 36 if the image were stationary, so that the electrical signal generated by the second phototransistor 50 corresponds to the carrier frequency component of the composite signal $\delta_c$. With the preferred disc configuration, rotating at 30 revolutions per seconds, this carrier frequency is 30,000 cycles per second.

The sinusoidal carrier signal is thereupon filtered by a second bandpass filter amplifier 52 having a center frequency of 30,000 cycles per second. The second filter amplifier output signal is limited by a second limiter 54 to produce a square waveform having transition points which correspond to the zero crossings of the carrier sine wave. This square wave has a peak to peak amplitude corresponding to that of the composite signal $\delta_c$, to avoid detrimental loop gain variations when applied to the phase controlled loop, and defines the reference signal $\delta_r$.

Since the amplifiers 44, 52 are tuned for a particular carrier frequency and to prevent departure from the optimization of the loop dynamics, it is important that the carrier frequency remain constant. Fluctuations in the motor speed resulting from variations in the nominal 400 cycle per second power signal available in aircraft, produce spurious fluctuations in the carrier frequency. In order to maintain consistency of the carrier frequency, a servo system 56 may be provided.

The servo 56 monitors the reference signal $\delta_r$ to control the speed of the motor 42 such that the disc rotation produces a constant carrier frequency. For example, a frequency-to-voltage convertor 58, having an input connected to the output of the second limiter 54, generates a voltage signal having a magnitude corresponding to the frequency of the reference signal $\delta_r$. The converter output signal is compared, at a comparator 60, to a reference voltage source 62 which represents the voltage which will cause the disc to rotate at 30 revolutions per second, generating an error signal which is applied to a servo amplifier 64. The servo amplifier 64 may be comprised of the series combination of a loop compensation filter, a 400 cycle per second chopper, and a 400 cycle per second amplifier, and its output is applied to the disc motor 42 in order to control its speed.

Furthermore, the maintaining of a reference frequency which concurrently corresponds to the frequency of the carrier component of the composite signal $\delta_r$ is desirable so that the image velocity analog $\epsilon$ is accurately representative of image motion. It is apparent that the sectors 38, 40 intercepting the flux from the reference light source 44, describe a moving grid with respect to a non-moving or reference image. Further, this reference grid is geometrically related in time to the moving grid associated with the moving image, since the same disc is used for simultaneous interruption of both the moving image and the reference image. Under ideal conditions of disc rotation, the geometry-time characteristics of the grid associated with the moving image are identical to the geometry-time characteristics of the grid associated with the reference image, so that the further processing of the reference signal $\delta_r$ and the composite signal $\delta_c$, in accordance with the invention, generates an image velocity analog $\epsilon$ representative only of image motion.

In practice, however, imperfections in disc rotation which produce variations in the respective rates of interruption between the moving image and the reference image, provide an error component in the image velocity analog $\epsilon$, which if left uncompensated, would interfere with the time image motion information.

Figure 3:
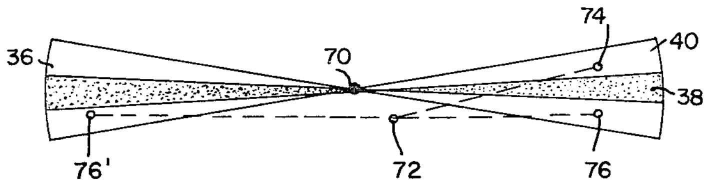
FIG. 3 is an illustration of a portion of the disc of FIG. 2, for exemplifying disc eccentricity.

For example, although great care may be employed in the manufacture of the disc 36 and its connection to the motor 42, it is inevitable that the disc 36 will rotate eccentrically with respect to its true center. This condition of eccentricity is shown (somewhat exaggeratedly) in FIG. 3, illustrating a portion of the disc 36 having a true center 70. Due to imperfections in the manufacture and installation of the disc 36, the disc in operation rotates about a rotational center 72. The moving sectors 38, 40 define a first grid with respect to an effective position 74 of a moving image, and a second grid with respect to an effective position 76 of a non-moving reference image 66. As the disc 36 rotates about its rotational center 72, the distance of the moving image 64 from the true center 70 of the disc is continually changed, so that the effective sector width of the grid intercepting the moving image position 74 is continually changed. Similarly, the effective sector width of the grid intercepting the reference image position 76 is continually changed. In both cases, the error in effective sector width repeats itself once every revolution of the disc.

Figures 4, 6:
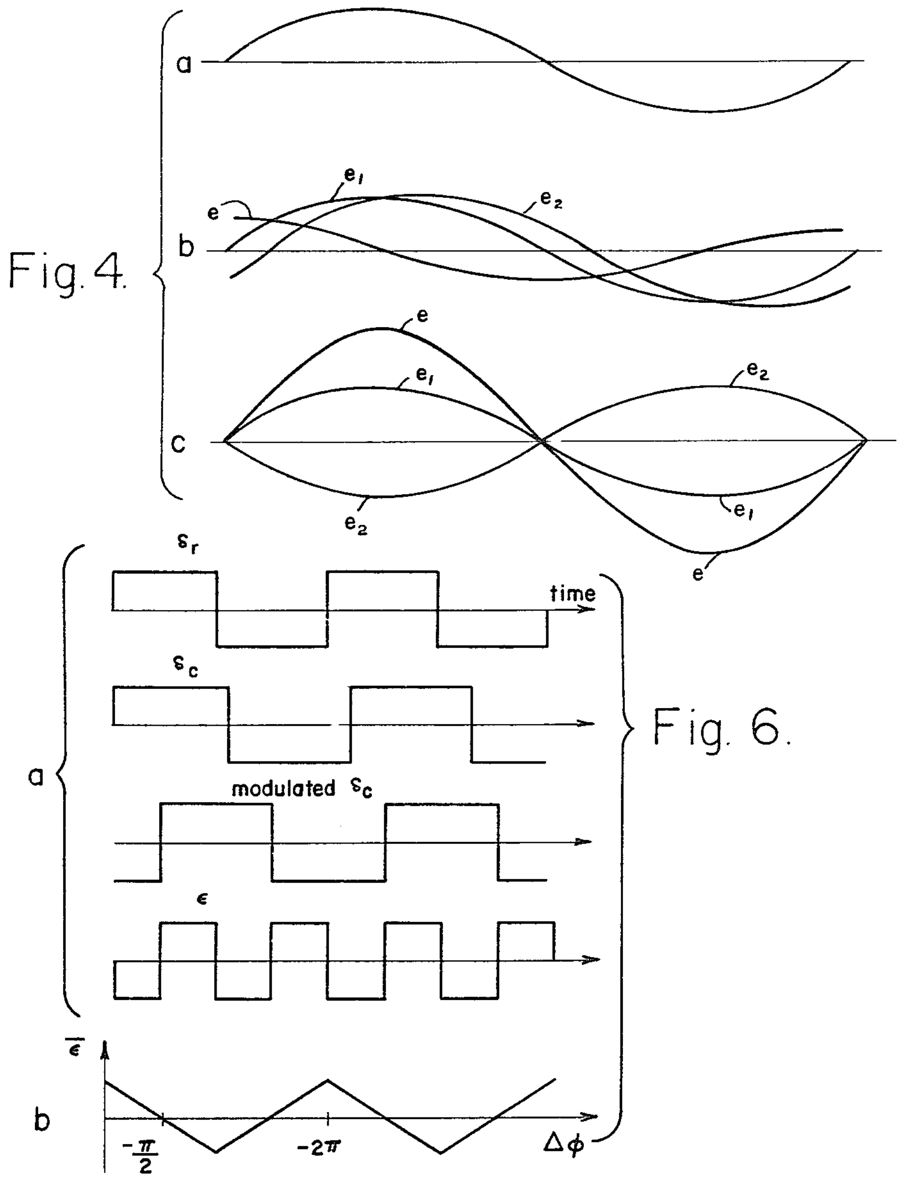
FIG. 4 is a series of ecentricity error waveforms.
FIG. 6 is a representation of idealized waveforms of signals concerned with the phase controlled loop of FIG. 5.

Since the amount of phase variation in each of the two signals generated by the grids, due to eccentricity, is determined by the variation in the effective sector width at each of the two positions 74, 76, this phase variation is responsive to the degree of eccentricity of the disc 36, or the distance between the true center 70 and the rotation center 72, and the respective radii from the rotational center 72 to each of the two positions. The variation in effective sector width (and hence the phase variation) during one revolution of the disc 36, due to eccentricity, is shown in FIG. 4(*a*). This variation is a sine wave having a period corresponding to one revolution of the disc 36, and having an amplitude determined by the degree of eccentricity of the disc 36 and the position radius.

In FIG. 4(*b*), there is shown a first sine wave *e*, representing the phase variation due to eccentricity in the signal generated by the grid at, for example, the image position 74. Similarly, sine wave $e_2$ represents the phase variation, due to eccentricity, of the second signal generated by the grid at the reference position 76. For a given disc, the amount of the difference in the phase variation between the two signals, at any time due to eccentricity, is determined by the instantaneous difference in the effective sector width at each of the two positions. This instantaneous difference in the phase variation of the two signals due to eccentricity, is represented by an eccentricity error *e* in FIG. 4(*b*). If it were possible to superimpose the reference position 76 upon the image position 74, the eccentricity error *e* would be zero at all times, since the instantaneous variation in effective sector width at the two positions would always be identical. By keeping the instantaneous difference in the sector width variation as small as possible, however, by placing the reference position 76 as close as practicable to the image position 74, the amplitude of the eccentricity error *e* is decreased. This decreases the instantaneous difference in the phase variation (due to eccentricity) between the composite and the reference signal $\delta_c$, $\delta_r$, permitting the cross-multiplier to operate with its dynamic range. In this respect, it should be noted that if the image position 74 and the reference position 76 were 180° apart, indicated by the alternative reference position 76', the difference in the sector width variations would be maximized, resulting in a maximum amplitude of the eccentricity error *e*, as shown in FIG. 4(*c*).

Since the frequency of the reference signal $\delta_r$ is maintained at a constant frequency by the disc-motor servo 56 (see FIG. 2), the eccentricity error in the composite signal $\delta_c$ is referenced to the eccentricity error in the reference signal $\delta_r$. Consequently, the phase of the composite signal $\delta_c$ is affected in accordance with the eccentricity error *e*.

Even though the amplitude of the eccentricity error *e* is kept small the fact of its existence modulates the image velocity analog signal $\bar{\epsilon}$ in accordance with the frequency of the eccentricity error *e*. The modulation frequency due to eccentricity is determined uniquely by the speed of the disc 36, since all disturbances due to eccentricity reoccur once per disc revolution. For example, if the disc 36 rotates at 10 revolutions per second, the frequency of the eccentricity error *e* will be 10 cycles per second, and the image velocity analog signal $\bar{\epsilon}$ will exhibit fluctuations having a corresponding frequency. The eccentricity error *e* is in fact a periodic phase jitter, and since it is very slow compared to the loop time constants, it will be tracked by the loop and passed on to the image velocity analog carrier $\bar{\epsilon}$.

In apparatus according to the present invention, employing rotating interruption means for generating the composite signal $\delta_c$ and the reference signal $\delta_r$, the eccentricity error is discarded in the following manner. The speed of the disc is established such that a large eccentricity frequency is generated in comparison to the highest frequency of the fluctuations of the image velocity analog $\bar{\epsilon}$ which might be expected due to variations in image velocity. This assures that the eccentricity frequency modulation of the velocity analog signal $\bar{\epsilon}$ can be distinguished from true variations in image velocity, such as would be experienced when an aircraft is flying over successive mountain peaks. The eccentricity frequency is thereupon discarded from the velocity analog signal $\bar{\epsilon}$.

It is unlikely that any fluctuations in the velocity analog signal $\bar{\epsilon}$, due to image velocity variations, will have a repetition rate in excess of 10 cycles per second. A sufficiently high eccentricity frequency, to avoid confusion of the two sources of modulation frequencies, is 30 cycles per second. The disc 36 is therefore caused to rotate at 30 revolutions per second, since all disturbances due to eccentricity of the disc 36 reoccur once each revolution, providing an eccentricity frequency of 30 cycles per second.

This eccentricity frequency is thereupon discarded from the image velocity analog signal $\bar{\epsilon}$ by a sharply tuned filter. For example, a parallel-T filter having a 30 cycle per second notch may be utilized to discard the eccentricity modulation frequency.

It should be noted that other conditions of disc rotation irregularities do not adversely affect the operation of apparatus made in accordance with the invention. For example, returning once again to FIG. 2, if the surface of the disc 36 is not positioned exactly orthogonal to the image optical axis, the sectors 38, 40 will intercept the image and the light source at identical speeds, so that the grid geometry-time characteristics at both the image and the reference positions are identical.

If, however, the disc 36 exhibits a wobbling motion during rotation (i.e., if the motor shaft is bent or if the surface of the disc is not positioned exactly perpendicular to the motor shaft), the unstabilized image and the reference image will "move" in opposite directions with respect to each other, upon being intercepted by the disc 36. Fortunately, the mechanical parts which might contribute to wobble can be precisely fabricated, so that wobble (unlike eccentricity) is not a source of error. Furthermore, even if wobble were present, its effects reoccur once each revolution of the disc, describing a sinusoidal effect having a frequency identical to the frequency of the eccentricity error. If errors due to wobble are present, therefore, they will be discarded by the eccentricity filter.

Figure 5:
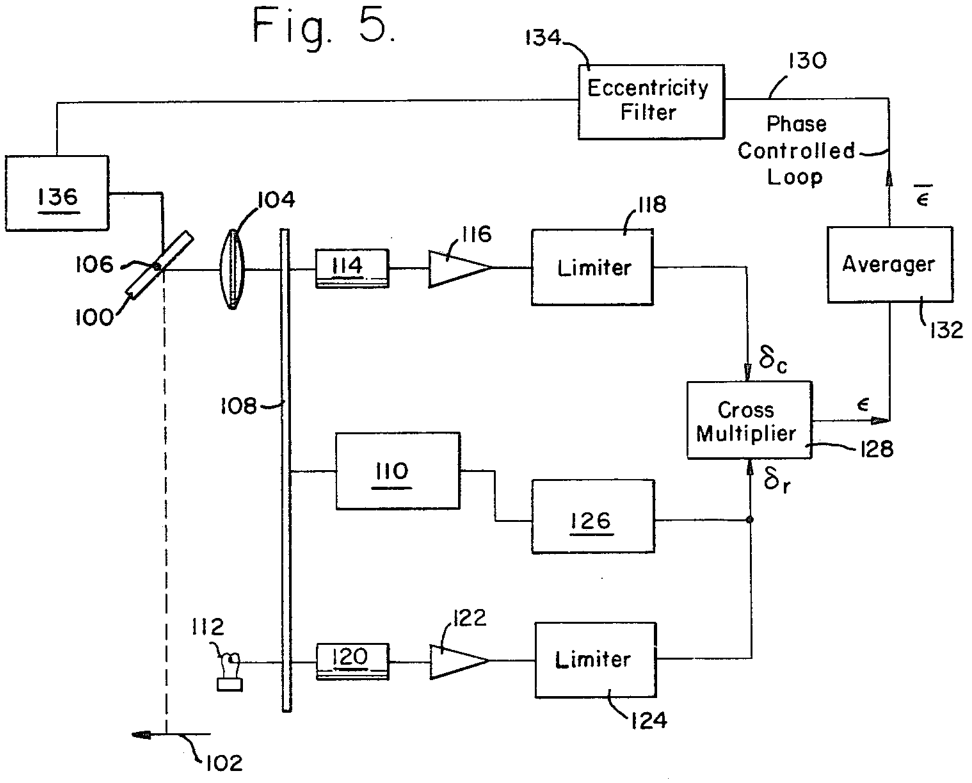
FIG. 5 is a block diagram of a preferred embodiment of appaartus according to the present invention, illustrating a "moving mirror" image stabilizer.

Turning now to FIG. 5, there is shown a preferred embodiment of apparatus according to the present invention, more specifically an image stabilizer, in which a mirror 100 is provided in the optical path between a moving target 102 and a lens 104. The mirror 100 is rotatable about a pivot 107, such that rotation of the mirror 100 will change the velocity of the image projected by the lens 104.

The combination of a disc 108 having alternate opaque and transparent (or translucent) sectors thereon and a motor 110, provide a moving grid with respect the moving image and a light source 112, in accordance with the preferred mechanization shown in FIG. 2. The interrupted moving image is received by a first phototransistor 114, and the phototransistor output signal is filtered by a first filter amplifier 116 and limited by a first limiter 118, for generating the electrical composite signal $\delta_c$. Similarly, the electrical reference signal $\delta_r$ is generated as the flux from the light source 112 is interrupted by the rotating disc 108, and received by a second phototransistor 120 to produce an output signal which is filtered by a second filter amplifier 122 and limited by a second limiter 124. It should be noted that the first and second phototransistors 114, 120 are preferably positioned as close together as practicable, in order to decrease the amplitude of the periodic variation in the phases due to eccentricity of the disc 108; the apparent departure from such proximity in FIG. 5 is for convenience of illustration only. A servo system 126 is provided for maintaining a consistent carrier frequency.

The composite signal $\delta_c$ and the reference signal $\delta_r$, exhibiting nearly ideal square waveforms having a standardized peak to peak amplitude, are supplied as the signal inputs to a cross-multiplier 128. The cross-multiplier 128 is utilized as the phase error detector of a phase controlled loop 130, while the composite signal $\delta_c$ is phase modulated to bring and maintain the composite signal $\delta_c$ in phase and frequency lock with the reference signal $\delta_r$.

FIG. 6, showing a series of wave forms which illustrate the operation of the phase controlled loop 130, is to be considered in conjunction with FIG. 5. For this example, a type of cross-multiplier is employed which produces a condition of phase lock when its input signals are 90° out of phase, or in phase quadrature. This type of cross-multiplier is often utilized in the mechanization of phase controlled loops, and is well known to the electronic art.

The reference signal waveform $\delta_r$ is indicated as the first waveform in FIG. 6, while the second waveform represents the composite signal $\delta_c$ when the image is moving in the same direction as the grid. It is seen that the composite signal $\delta_c$ has a lower frequency than the reference signal $\delta_r$, in the case as described; if the image, however, were moving in a direction opposite that of the moving grid of the disc 108, the frequency of the composite signal $\delta_c$ would be higher than that of the reference signal $\delta_r$. In either case, the difference in frequency between the reference signal $\delta_r$ and the composite signal $\delta_c$ is proportional to the degree of image instability in the direction considered, or image velocity.

The cross-multiplier 128 generates an output signal $\epsilon$ which represents the instantaneous product of its two input signals. The waveform generated by the cross-multiplier 128 is a function of the phase difference between the two input signals, and the cross-multiplier output signal is applied to a filter 132, for generating a filter output signal $\bar{\epsilon}$ which is the average value of the product of the two cross-multiplier input signals. The filter output signal $\bar{\epsilon}$ is shown as a function of the phase difference between the two cross-multiplier input signals, in FIG. 5(*b*), which describes the characteristic of this type of cross-multiplier. When the two cross-multiplier input signals are 90° out of phase, the filter output signal $\bar{\epsilon}$ approaches a zero value, as indicated by the cross-multiplier characteristic.

In the preferred embodiment of FIG. 5 the averaged cross-multiplier output signal $\bar{\epsilon}$ is applied to an eccentricity filter 134 for discarding the eccentricity error frequency supplied by the disc 108, after which it is applied to a means for rotating the mirror 100, such as a solenoid 136. In response to the energization of the solenoid 136, the mirror 100 is caused to rotate at a velocity which tends to decrease image instability. The phase of the image is therefore modulated in accordance with the averaged cross-multiplier output signal $\bar{\epsilon}$, effectively phase modulating the electrical composite signal $\delta_c$ input to the cross-multiplier 128 until its frequency is identical to the frequency of the reference signal $\delta_r$ input. When the two cross-multiplier input signals have identical frequencies, the cross-multiplier 128 pulls them into phase lock. This condition of frequency similarity and phase lock is indicated in FIG. 6(*a*), where the modulated composite signal $\delta_c$ is shown lagging the reference signal $\delta_r$ by 90°. The cross-multiplier output signal $\epsilon$, for this condition, is represented by the fourth waveform of FIG. 6(*a*), and it is evident that the average value of this product waveform $\epsilon$ approaches zero when the two cross-multiplier input signals have the same frequency and their phases are locked in quadrature. When this occurs, the image will be stabilized.

When the reference signal $\delta_r$, and the modulated composite signal $\delta_c$ are phase locked, other signals which may be present, such as extraneous noise, are virtually ignored by the phase controlled loop 130. Within reasonable limits of amplitude fluctuation of the two cross-multiplier input signals, the cross-multiplier output signal $\epsilon$ is responsive only to the phase error between the two input waveforms. Furthermore, since the average value of the cross-multiplier output $\bar{\epsilon}$ is the rate of phase change to provide frequency similarity between the composite signal $\delta_c$ and the reference signal $\delta_r$, it is responsive only to the frequency component of the composite signal $\delta_c$ which corresponds to image velocity in the selected direction.

The preferred embodiment of the present invention, or the "moving mirror" image stabilizer, may be employed in an aerial camera to compensate for image motion originating from the relative movement of the aircraft with respect to the terrain as well as to compensate for other contributions to image instability. When so utilized, it should be noted that means must be provided to return the mirror 100 to a starting position between film exposure intervals of the camera, and to trigger mirror motion at the beginning of each exposure interval. Apparatus for accomplishing these purposes are well known to the camera art, and are external to the present invention.

It should further be noted that when the preferred embodiment is utilized in an aerial camera, the lens 104 may be replaced by the objective lens of camera and off-axis rays may be utilized to provide image stability sensing. The image stabilization accomplished by the preferred embodment is so responsive to changes in image velocity that it is not necessary to provide a stabilized platform in order to decrease aircraft perturbations and other vibrations which would otherwise destabilize a camera image. So long as the camera can be aimed at a desired target, the "moving mirror" image stabilizer of the present invention will provide a non-moving image on the film format of the camera. The high degree of image stability thereby provided allows the accomplishment of aerial photography without the expense of providing a stabilized platform. If a stabilized platform is utilized, however, it need not exhibit a high degree of performance and hence may be of low quality and relatively small expense.

In addition, the preferred embodiment may be employed wherever it is desirable to stabilize an image produced by an optical system. In such cases, the optical system may replace the lens 104, and off-axis rays may be utilized to provide image stability sensing.

Figure 7:
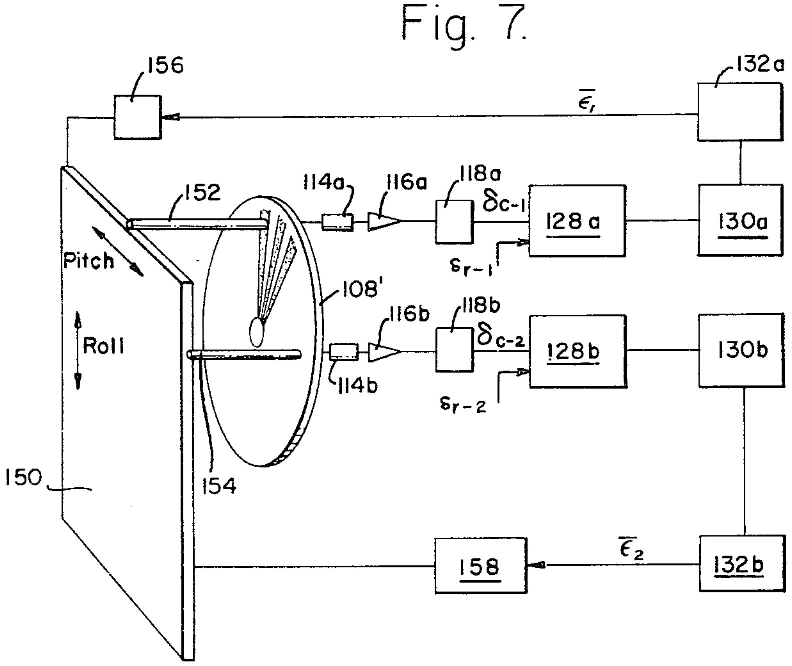
FIG. 7 is a block diagram, shown partly in perspective, of a first alternative embodiment of apparatus according to the present invention, illustrating a "moving platen" image stabilizer.

Turning now to FIG. 7, an alternative embodiment of apparatus according to the present invention produces stabilization of an image having velocity components in perpendicular directions along a surface, with respect to a confined area of that surface. This embodiment finds particular application in an aerial camera having a movable platen 150. The platen 150 follows the movement of the image in both the pitch and roll directions, so that the image is completely stabilized with respect to the platen.

A first light pipe 152 is attached to the platen 150 such that it intercepts the optical image on the platen 150. The image received by the light pipe 152 includes a velocity component in the pitch direction, and this moving image is interrupted by the grid upon a disc 108', moving in a direction parallel to the pitch direction of the moving image. The disc 108' is similar to the disc 108 of FIG. 5, and includes a motor which is controlled by a servo system (not shown) as in the preferred embodiment. A second light pipe 154 is attached to the platen 150 in order to intercept the image on the platen for transmission to the grid at the location on the disc 108' where the grid is moving parallel to the image roll direction.

In the alternative embodiment of FIG. 7, reference numerals preceded by the letter "*a*" are applied to a first set of components similar to those of the preferred embodiment. A first composit signal $\delta_{c-1}$ is therefore generated as an input to a first cross-multiplier 128*a*, while a second composite signal $\delta_{c-2}$ is generated as an input to a second cross-multiplier 128*b*. A first reference signal $\delta_{r-1}$ is similarly generated as an input to the first cross-multiplier 128*a*, in accordance with the apparatus of the preferred embodiment of FIG. 5 (not shown), while a second reference signal $\delta_{r-2}$ is generated as an input to the second cross-multiplier 128*b*. It is noted that a separate light source (not shown) is required in the generation of each of the reference signals, with each light source positioned as close as practicable to the moving image position to which it corresponds.

A first image velocity analog signal $\bar{\epsilon}_1$ is generated which is responsive to the pitch direction of image instability, and is applied to a first platen mover 156. The first platen mover 156 provides compensating motions to the platen 150, in the pitch direction, in response to the first velocity analog signal $\bar{\epsilon}_1$. Similarly, a second velocity analog signal $\bar{\epsilon}_2$ is generated, and is applied to a second platen mover 158 which provides compensating movements to the platen 150 in the roll direction.

Since the light pipes 152, 154 are attached to the platen 150, means must be provided so that the ends of the light pipes adjacent to the disc 108' remain stationary relative to their respective disc locations. This may be accomplished by coupling the disc 108', the four phototransistors and the two reference light sources, to the platen 150, such that they each move along with the movements of the platen. Alternatively, the light pipes, 152, 154 may have a flexibly intermediate portion, so that their ends adjacent to the disc 108' are not affected by the movement of the ends which are attached to the platen 150.

This first alternative embodiment, or "moving platen" image stabilizer, will provide a non-moving image with respect to a camera platen. As with the preferred embodiment, it should be noted that means must be provided to return the platen 150 to a starting position between film exposure intervals of the camera, and to trigger platen motion at the beginning of each exposure interval. Apparatus for accomplishing these purposes are well known to the camera art, and are external to the present invention. It should further be noted that this alternative embodiment operates directly upon the image which is seen by the film format. A stabilized platform is not required for the purpose of decreasing aircraft perturbations and other vibrations which could destabilize the image, since the alternative embodiment is very responsive to changes in image velocity.

Figure 8:
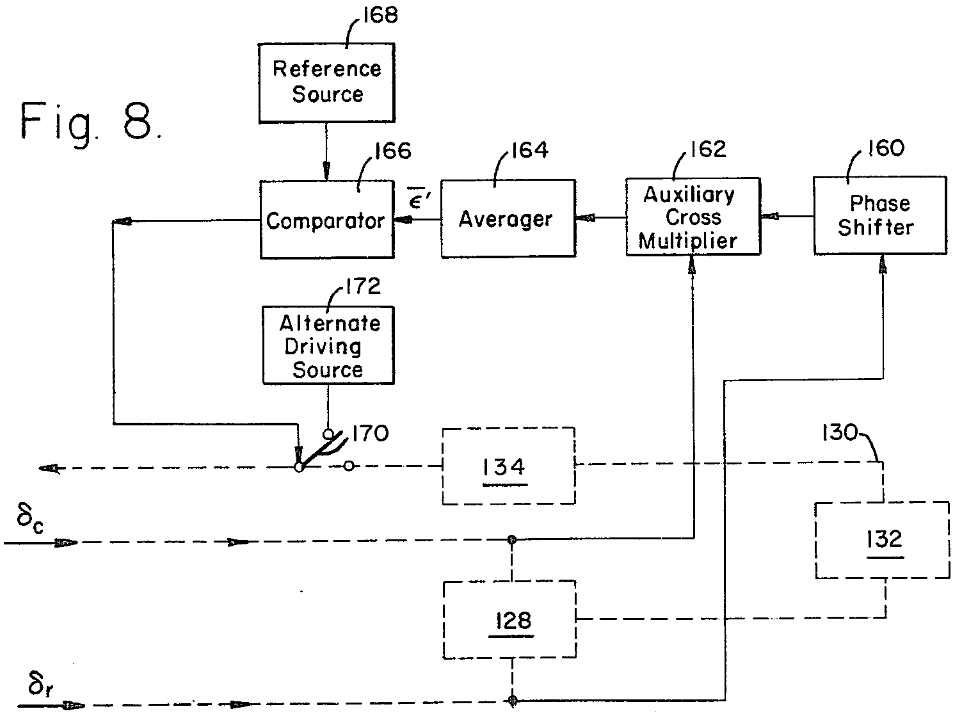
FIG. 8 is a block diagram of auxiliary apparatus for combination with the image stabilizers of FIGS. 5 and 7, for monitoring their quality of performance.

In FIG. 8, there is shown auxiliary apparatus which may be used in combination with the image stabilizers of the preferred and first alternate embodiments of the present invention, to monitor the quality of performance of the system. For example, in the preferred embodiment of FIG. 5, when the mirror 100 is rotating at the correct speed to maintain image stability, the image velocity analog signal $\bar{\epsilon}$ will approach zero. However, this signal $\bar{\epsilon}$ can also be zero when the system is not operating properly, for example, when problems of signal fading and loss are present. Such problems exist when terrain conditions are such that the first phototransistor cannot detect an adequate signal, for example, when the aircraft passes over a portion of terrain having light reflection characteristics insufficient to produce a receivable optical signal.

Referring once again to FIG 6(*b*), it is noted that the average value of the cross-multiplier output signal $\bar{\epsilon}$ will approach a maximum when the two cross-multiplier input signals have the same frequency and are exactly in phase. If the system is operating correctly, however, the two cross-multiplier input signals will have similar frequencies and will be 90° out of phase. In the auxiliary apparatus of FIG. 8, one of the cross-multiplier input signals, for example, the reference signal $\delta_r$ is shifted 90° in phase by a phase shifter 160. The output of the phase shifter 160 is applied as a first signal input to an auxiliary cross-multiplier 162, while the composite signal $\delta_c$ is applied as a second signal input to the auxiliary cross-multiplier 162. The product output is thereupon averaged by an auxliary averaging means 164, to provide a signal having a magnitude which represents the degree of signal correlation performed by the image stabilizer. This correlation signal $\bar{\epsilon}'$ is compared at a comparator 166 to a signal correlation reference source 168. When the correlation signal $\bar{\epsilon}'$ falls below the reference signal, a normally closed switch 170, located in the phase controlled loop 130 at the output of the eccentricity filter 134, opens to break the loop and to make contact with an alternate driving source 172. The alternate driving source 172 may be a source of a pre-set command signal, for example, for driving the mirror to maintain an approximate stability of the image.

When the correlation signal $\epsilon'$ regains a magnitude greater than the signal correlation reference source 168, the alternate driving source 172 will be disconnected from the loop 130. This can be accomplished, for example, by providing frequent sampling periods in which the switch 170 is caused to close to the loop 130, such as just before the beginning of a film exposure interval. If signal correlation is not sufficiently high, as determined by the comparator 166, the switch 170 will again open to make contact with the alternate driving source 172. If, however, signal correlation is sufficiently high to provide image stability, a signal will not be available to the switch 170 and the loop 130 will remain closed.

Figures 9, 12, 13, 14, 15:
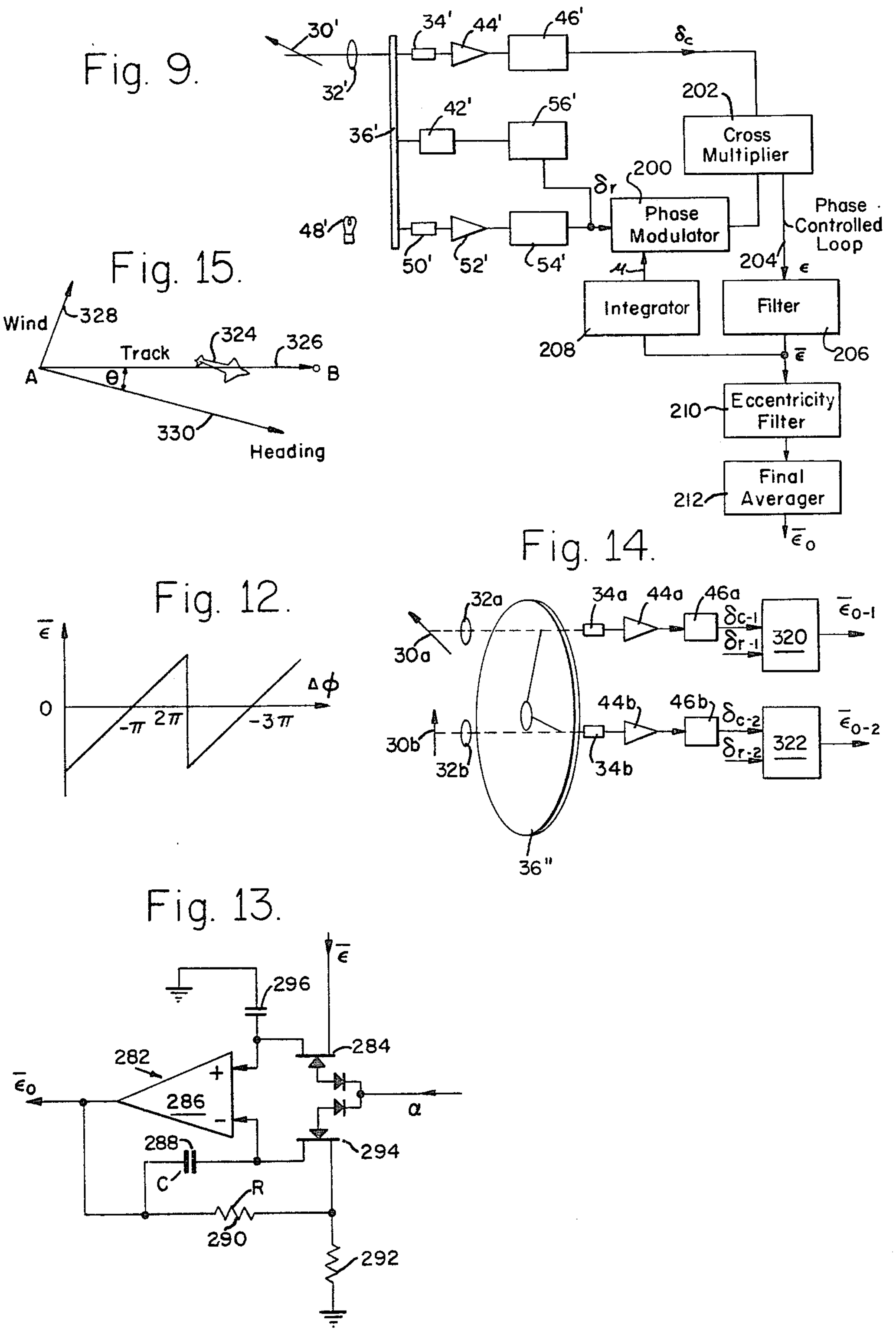
FIG. 9 is a block diagram of a second alternative embodiment of apparatus according to the present invention, illustrating an image velocity detector.
FIG. 12 is an illustration of the characteristic of the cross-multiplier utilized in the mechanization of FIG. 11.
FIG. 13 is a circuit diagram of a sample-an-hold network utilized in the mechanization of FIG. 11.
FIG. 14 is a block diagram, shown partly in perspective, of a third alternative embodiment of apparatus according to the present invention, for generating two electrical signals proportional to and representative of image velocity in different directions.
FIG. 15 is a vector diagram illustrating a drift problem in aeronautical navigation.

Turning now to FIG. 9, there is shown a second alternative embodiment of apparatus according to the present invention, more specifically an image velocity detector, which generates an output signal which is representative of image velocity parallel to a selected component direction.

The electrical composite signal $\delta$ and the electrical reference signal $\delta_r$ are generated in accordance with the preferred mechanization of the signal generation means, as shown in FIG. 2. Primed reference numerals are applied to components similar to those of the preferred mechanization shown in FIG. 2.

In this second alternative embodiment of the present invention, the electrical reference signal $\delta_r$ is phase modulated until its frequency is identical to that of the electrical composite signal $\delta_c$. The reference signal $\delta_r$ is therefore applied to the input of the phase modulator 200, and the phase modulator output signal is applied as an input to the cross-multiplier 202. The composite signal $\delta_c$ is also applied as an input to the cross-multiplier 202.

The product of the two cross-multiplier input signals is taken by the cross-multiplier 202 to generate a phase error signal $\epsilon$, which is thereupon applied to a phase controlled loop 204 which is ultimately closed to the phase modulator 200, to modulate the phase of the reference signal $\delta_r$. Since the error signal $\epsilon$ is a periodic function of a phase difference, its average value $\epsilon$ (which is a voltage proportional to a phase difference taken over a period of time) is a voltage proportional to a frequency. The reference signal $\delta_r$ must be modulated in accordance with a signal which is representative of phase, which is the integral of frequency, so that the filter output signal $\bar{\epsilon}$ is integrated by an integrator 208 to provide a phase modulating signal $\mu$ which is applied to the phase modulator 200.

Since the frequencies of the reference signal $\delta_r$ and the composite signal $\delta_c$ are not identical, the loop will not pull into lock until the modulating signal $\mu$ is a finite quantity which causes the frequencies of the two cross-multiplier input signals to be identical. At phase lock, the two input signals are synchronized so that the average value of their product $\bar{\epsilon}$ will seek a zero value, relative to its magnitude which is required to produce frequency similarity of the two input signals. The filter output signal $\bar{\epsilon}$ is therefore at a finite value which is proportional to the difference in the frequencies existing between the reference signal $\delta_r$ and the composite signal $\delta_c$, i.e., at a voltage which is proportional to the velocity component of the moving image in the selected direction.

As noted earlier, the image velocity analog signal $\bar{\epsilon}$ is frequency modulated in accordance with the disc eccentricity frequency of 30 cycles per second. This frequency modulation is discarded by applying the image velocity analog signal $\bar{\epsilon}$ to an eccentricity filter 210, such as a parallel–T filter having a 30 cycle per second notch. The eccentricity filter 210 may be positioned external to the phase controlled loop 204, so that the tracking dynamics of the loop are not restricted.

Although the filter 206 may be adapted to provide sufficient averaging to completely smooth out the fast jitter resulting from variations in image composition, it is preferred that its time constant be selected to optimize the tracking dynamics of a very responsive loop. Consequently, the eccentricity filter output is applied to a final averager 212 to further average the image velocity analog signal $\bar{\epsilon}$. The output of the final averager 212 is an electrical detector output signal $\bar{\epsilon}_0$ which is precisely representative of the image velocity component parallel to the selected direction.

Figure 10:
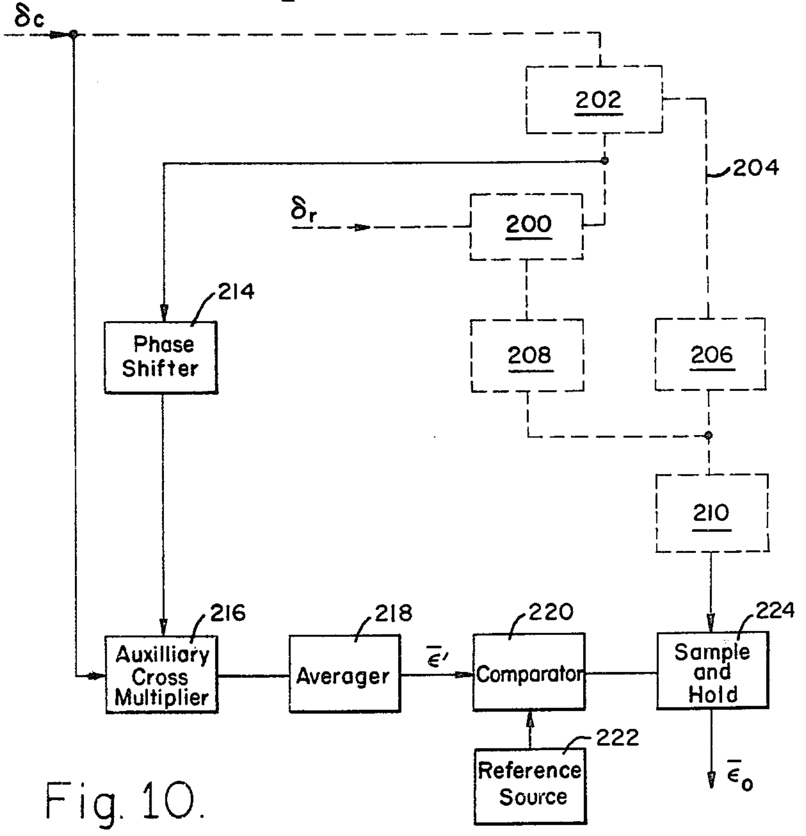
FIG. 10 is a block diagram of auxiliary apparatus for combination with the image velocity detector of FIG. 9, for monitoring the quality of detector performance.

In FIG. 10, there is shown auxiliary apparatus which may be used in combination with the image velocity detector of FIG. 9, for monitoring the correlation of the cross-multiplier input signals. The auxiliary apparatus further provides a substitute detector output signal when signal correlation is inadequate, such as when the quality of the composite signal $\delta_c$ is insufficient to accurately provide image velocity information. When the image velocity detector is generating a high quality composite signal $\delta_c$ input to the cross-multiplier 202, both of the cross-multiplier input signals will have the same frequency and will be separated in phase by a specific amount, determined by the cross-multiplier characteristic, which causes the loop 204 to be phase locked. It has been previously noted that when the cross-multiplier input signals are exactly in phase, the average value of their product is at a maximum value. According to the auxiliary apparatus indicated in FIG. 10, one of the cross-multiplier input signals (for example, the loop output signal which is in fact the modulated reference signal $\delta_r$) is shifted in phase by a phase shifter 214, by an amount which would cause the two cross-multiplier input signals to be exactly in phase if the loop were operating in phase lock. For example, if the characteristic of the cross-multiplier 202 were to provide a phase locked loop when its input signals were in phase quadrature, the phase shifter 214 will shift the phase of the modulated reference signal $\delta_r$ by 90°.

The composite signal $\delta_c$ and the phase shifted modulated reference signal $\delta_r$ are thereupon applied as inputs to an auxiliary cross-multiplier 216, to generate a periodic product signal which is averaged by an averager 218. The magnitude of the averager output signal $\bar{\epsilon}'$ is proportional to and representative of the degree of correlation performed by the phase controlled loop 204, which is indicative of the quality of the composite signal $\delta_c$.

The magnitude of this "quality" signal $\bar{\epsilon}'$ is compared, by a comparator 220, to a "quality" reference source 222 which is at a threshold voltage representing an acceptable degree of quality. If the quality signal $\bar{\epsilon}'$ falls below the threshold voltage, the comparator 220 generates a command signal which is sent to a sample-and-hold network 224, which includes the provision of an averaging function upon the output of the eccentricity filter 210 to generate the detector output signal $\bar{\epsilon}_0$ during normal operation. The command signal from the comparator 220 instructs the sample-and-hold network 224 to reject further data from the eccentricity output, and to provide an image velocity output signal from its memory. When the quality of the composite signal $\delta_c$ has improved above threshold, the command signal from the comparator 220 will be interrupted, and the sample-and-hold 224 will be reconnected to the eccentricity filter output for the resumption of normal operation.

Figure 11:
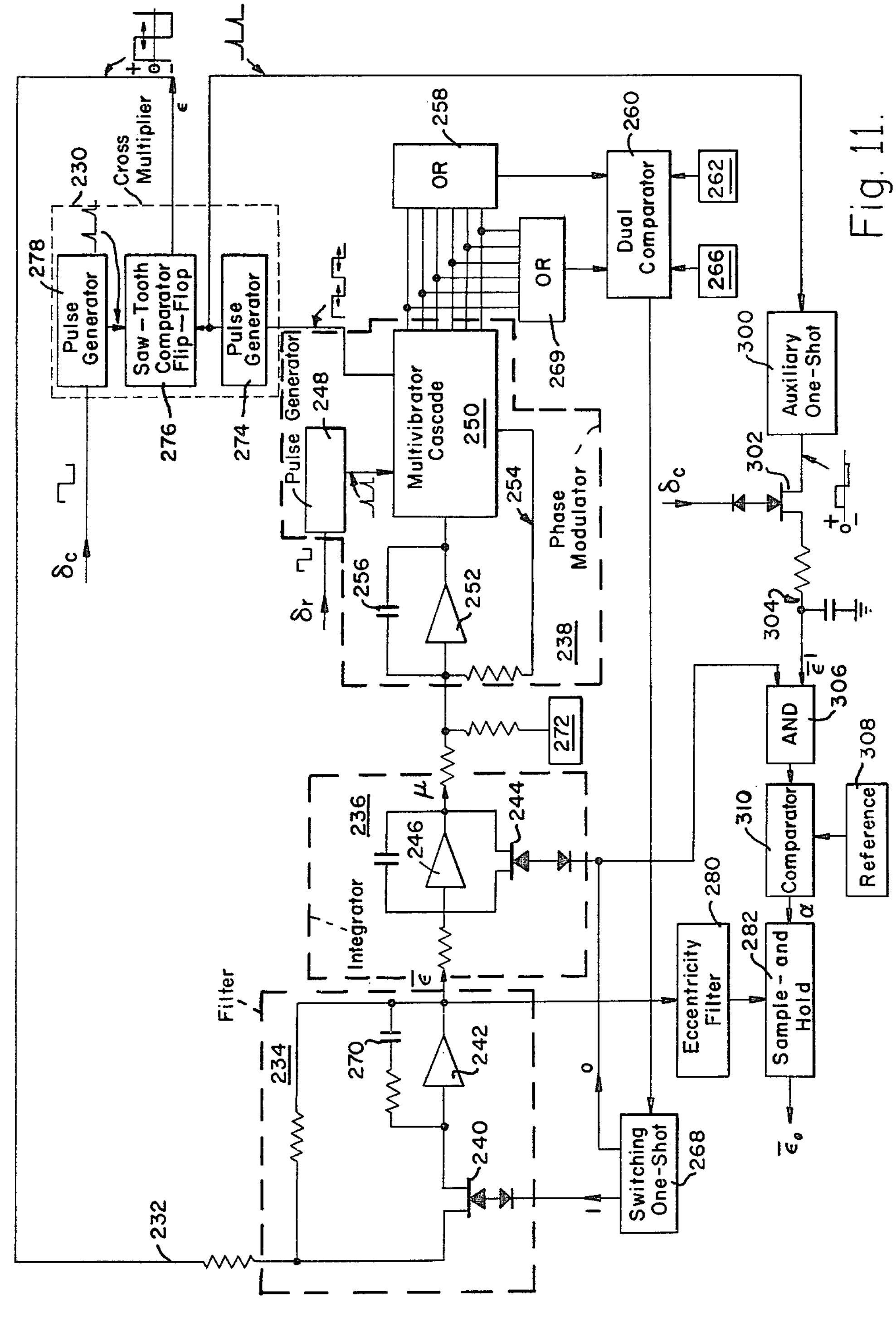
FIG. 11 is a circuit diagram, shown partially in block form, of a mechanization of an image velocity detector according to the present invention.

Turning now to FIG. 11, there is shown in partially block and partially circuit form, an example of one possible mechanization of an image velocity detector according to the present invention, including auxiliary apparatus for signal quality monitoring. The electrical composite signal $\delta_c$ and the electrical reference signal $\delta_r$ are generated in accordance with the apparatus of FIG. 2.

In this example, a cross-multiplier 230 having a saw-tooth characteristic is utilized, because of its increased dynamic range when compared to the type of cross-multiplier previously considered herein which produces a locked loop at quadrature phase difference. As shown in FIG. 12, the average value of the cross-multiplier output $\bar{\epsilon}$, as a function of the phase difference between the two cross-multiplier input signals, describes a saw-tooth. This saw-tooth characteristic has a zero value when the two cross-multiplier input signals are 180° out of phase, and a dynamic range of ±180°. The phase controlled loop is therefore locked when the input phases are 180° apart.

A phase controlled loop 232 is established from the output of the cross-multiplier 230, along the path including a filter 234, an integrater 236, and a phase-modulator 238, and terminating at an input of the cross-multiplier 230.

The periodic phase error signal $\epsilon$ is applied to the compensating filter 234 which averages the phase error over a period of time. The averaging time is determined from an optimization of the loop tracking dynamics. A first field-effect transistor 240 is provided at the input to the filter's operational amplifier 242, and is in a normally conducting state.

Since the filter output signal $\bar{\epsilon}$ is the difference in phase of the two cross-multiplier input signals taken over a period of time, it is the derivative of the phase correction which must be applied to the reference signal $\delta_r$ in order to match its frequency with that of the composite signal $\delta_c$, when the loop 232 is in phase lock. The average value of the phase error is therefore integrated by the integrator 236, in order to provide a phase modulating signal $\mu$ to the phase modulator 238. A normally open second field-effect transistor 244 is connected between the input and output of the integrator's operational amplifier 246, in order to short circuit the integrator 236 upon command.

The reference signal $\delta_r$ is applied to a first pulse generator 248 for generating a plurality of electrical trigger pulses, each of which correspond to a positive cross-over in the reference signal waveform. These trigger pulses are applied to a first one-shot multivibrator of a multivibrator cascade 250. The multivibrator cascade 250 may be a series combination of six one-shot multivibrators, and the output of the last one-shot is applied as an input to the cross-multiplier 230 to complete the phase controlled loop 232.

The modulation signal $\mu$ is applied as a control signal to each of the one-shots in the multivibrator cascade 250. The trigger pulse from the first pulse generator 248 is applied to the first one-shot, for generating a pulse which is delayed in accordance with the modulating signal $\mu$. The pulse generated by the first one-shot, which has been delayed by the delay width contributed by the first one-shot, is applied to the second one-shot as a trigger pulse. This second one-shot trigger pulse is delayed in accordance with the modulating signal, and the twice-delayed pulse generated by the second one-shot is applied as a trigger to the third one-shot. Similarly, the pulses generated by the third, fourth and fifth one-shots are delayed in accordance with the history of their respective trigger pulses and the modulating signal $\mu$. Each pulse generated by each stage of this six stage cascade of one-shots, is fed back to the input of the modulator's operational amplifier 252, as indicated by the representative feedback path 254, to assure that the total phase delay performed by the multivibrator cascade 250 is proportional to the modulating voltage $\mu$. A capacitor 256 is shunted across the amplifier 252, to desensitize the amplifier to the high carrier frequency.

When the phase controlled loop 232 is operating in phase lock, the output signal of the phase modulator 238 describes a square waveform which is identical in frequency to the composite signal $\delta_c$, and which is 180° out of phase with the composite signal $\delta_c$.

Since the operating range of the individual one-shots comprising the multi-vibrator cascade 250 is limited, means must be provided to reset the one-shots as they exceed their maximum or minimum duty cycle, without causing the loop to lose its locked condition. For example, the one-shots in the multivibrator cascade 250 may be set to initially operate at a 50% duty cycle, and reset when the duty cycle of any of the one-shots increases to 90% or decreases to 10%. Accordingly, each of the outputs of the one-shots are applied to a first "OR" gate 258 which is responsive to the one-shot output operating with the greatest duty cycle. The output of the first "OR" gate is applied to a first input of a dual comparator 260 for comparison with a high reference 262 corresponding to a maximum duty cycle of 90%. Similarly, each of the one-shot outputs in the multivibrator cascade 250 is applied to a second "OR" gate 262 which is responsive to the one-shot output operating at the smallest duty cycle. The output of the second "OR" gate 262 is applied to a second input of the dual comparator 260, for comparison with a low reference 266 corresponding to a minimum duty cycle of 10%. Consequently, if the duty cycle of any of the one-shots exceeds a maximum of 90% or falls below a minimum of 10%, the dual comparator 260 responds by sending a reset trigger pulse to a switching multivibrator 268 having one shot operation.

When the reset trigger pulse is not applied to the switching one-shot 268, a first or "0" output signal is generated which maintains the second field-effect transistor 244 in a non-conducting state. During this time, the first field-effect transistor 240 remains in a conducting state. These conditions describe the normal operaton of the filter 234 and the integrator 236, when the multivibrator cascade 250 is operating within its limits.

When any of the one-shots in the multivibrator cascade 250 reaches either its minimum or its maximum duty cycle, the reset trigger pulse supplied by the dual comparator 260 causes the switching one-shot 268 to respond with a "1" output pulse, cutting off the "0" signal. This single "1" pulse causes the first field-effect transistor 240 to change to a non-condutcing state, while the removal of the "0" signal causes the second field-effect transistor 244 to change to a conducting state, for the duration of "1" pulse. Under these conditions, the error signal $\epsilon$ is effectively ignored, since the filter amplifier 242 acts as a zero impedance source. The filter capacitor 270, however, maintains its accumulated charge, so that after the multivibrator cascade 250 has been reset, the operation of the loop 232 is resumed with the last good value of the veloc ity analog signal $\bar{\epsilon}$. During the resetting operation the last good value of velocity analog signal $\bar{\epsilon}$ is present at the output of the filter 234 but the integrator amplifier 246 is shorted, so that the modulating signal $\mu$ is zero volts at the input of the phase modulator 238. A reset voltage source 272 is provided at the input to the phase modulator amplifier 252, and the control signal thereby applied to each of the one-shots in the multivibrator cascade 250 resets each of them to a 50% duty cycle.

The square wave signal output of the phase modulator 238 has negative cross-overs which are positioned in time in accordance with the total delay provided by the phase modulator. This phase modulator output signal is applied to a pulse generator 274, for generating trigger pulses which coincide in time with the negative cross-overs of the output waveform of the phase modulator 238. These trigger pulses are applied to a "reset" input of a saw-tooth comparator flip-flop 276.

The composite esignal $\delta_c$ is applied to a third pulse generator 278, for generating trigger pulses which coincide with the positive cross-overs of the composite signal waveform. These trigger pulses are applied as a "set" input to the saw-tooth comparator flip-flop 276.

The time which the flip-flop 276 spends in the "set" state will therefore be the time between the "set" input pulse and the "reset" input pulse. The flip-flop output is a positive voltage while in the set state, and an equal negative voltage in the reset state, so that the position in time of the negative cross-overs of the flip-flop output waveform coincide with the negative crossovers of the phase modulator output waveform. The average value of the flip-flop output, as taken by the compensating filter 234, will be a sawtooth function of the phase error as illustrated in FIG. 12. When the flip-flop set and reset pulses are 180° out of phase, the average flip-flop output will be zero and the phase controlled loop 232 will be in phase lock.

During normal operation of the phase controlled loop 232, the image velocity detector output signal $\bar{\epsilon}_0$ is obtained by direct connection with the output of the compensating filter 234. The loop 232 is tapped at the compensating filter output, and the image velocity analog signal $\bar{\epsilon}$ is applied to an eccentricity filter 280, such as a parallel-T filter network which is designed to give zero transmission at the eccentricity frequency of 30 cycles per second. The output of the eccentricity filter 280 is thereupon applied to a sample-and-hold network 282 where the image velocity analog signal is further averaged to provide the detector output signal $\bar{\epsilon}_0$.

When the loop 232 is not operating in phase lock, or when the multivibrator cascade 250 is being reset, the detector output signal $\epsilon_0$ is provide from the memory of the sample-and-hold 282, when a memory instruction signal $\alpha$ is applied to the sample-and-hold. An example of a sample-and-hold network 276 is shown in FIG. 13, where the image velocity analog signal $\bar{\epsilon}$ (after the eccentricity frequency has been discarded) is applied across a normally conducting third field-effect transistor 284, to a first or positive input of a difference amplifier 286. The amplifier output is fed back to a second or negative input of the difference amplifier 286, through a parallel combination of a capacitor C288 and a resistor R290.

During normal operation, the capacitor C288 is charged to a voltage corresponding to an average value of the image velocity analog signal $\bar{\epsilon}$ and accordingly, the detector output signal $\bar{\epsilon}_0$ from the amplifier responds to this average value. The charge on the capacitor C288 is cumulative and the total charge will change with a change in the image velocity analog signal $\bar{\epsilon}$. However, the values of the resistor R290 and the capacitor C288 can be adjusted so that the capacitor charge changes "slowly," as determined by the averaging time RC which may typically be approximately 0.1 second. Transient disturbances, such as jitter still remaining in the image velocity analog signal $\bar{\epsilon}$, will therefore have little effect upon the detector output signal $\bar{\epsilon}_0$. A "long term" disturbance, however, such as a change in image velocity, will cause the detector output signal $\bar{\epsilon}_0$ to respond thereto.

The amplifier gain may be set by a resistor 292 such that the voltage of the detector output signal $\bar{\epsilon}_0$ has any desired scale factor of output voltage versus image velocity.

A fourth field-effect transistor 294, which is in a normally conducting state, is provided between the resistor R290 and the negative input to the difference amplifier 286. The gates of each of the third and fourth field-effect transistors 284, 294 are responsive to the memory instruction signal $\alpha$, for rendering the field-effect transistors non-conductive. Upon the application of the memory instruction signal $\alpha$ to the sample-and-hold network, the image velocity analog signal $\bar{\epsilon}$ is disconnected from the difference amplifier input, and the amplifier input signal is established by the voltage of the capacitor C288. Thus, when circumstances are such that the image velocity analog signal $\bar{\epsilon}$ is not truly representative of image velocity, it is removed from the detector output and the output singal $\bar{\epsilon}$ is provided from the memory of the sample-and-hold. In addition, a second capacitor 296 is provided at the positive input of the difference amplifier 286, for "remembering" the last acceptable value of the image velocity analog signal $\bar{\epsilon}$.

Returning once again to FIG. 11, apparatus is shown for determining when the image velocity analog signal $\bar{\epsilon}$ is not truly representative of image velocity, and for generating the memory instruction signal $\alpha$ when these conditions exist. For example, if the composite signal $\delta_c$ were absent for any reason, the flip-flop 276 will act like a binary counter driven by the output signal of the phase modulator 238. In such a case, the average value of the cross-multiplier output $\bar{\epsilon}$ will be zero, although not representative of the image velocity.

According to the characteristic of the cross-multiplier 230 (shown in FIG. 12), the phase controlled loop 232 will be locked when the two cross-multiplier input signals are 180° out of phase. As discussed earlier, if one of these input signals is shifted in phase by 180° when the loop 232 is operating in phase lock, the average value of the product of the unchanged signal with the phase shifted signal will approach a maximum, as indicated in FIG. 12. Consequently, in the mechanization shown in FIG. 11, the output signal waveform of the phase modulator 238 is compared to the waveform of the composite signal $\delta_c$, after shifting the waveforms 180° with respect to each other, and a quality signal $\bar{\epsilon}'$ generated with is representative of the quality of the detector operation.

Accordingly, the reset input pulses to the sawtooth comparator flip-flop 276, which coincide with the negative cross-overs of the output waveform of the phase modulator 238, are applied to trigger an auxiliary one-shot 300. The output of the auxiliary one-shot 300 is a square wave having a 50% pulse width, and having a positive amplitude greater than the negative amplitude. The output pulse of the auxiliary one-shot 300 is 180° out of phase with the phase modulator output waveform. An auxiliary field-effect transistor 302 is positioned in the path between the auxiliary one-shot output and an averaging filter 304. The composite signal $\delta_c$ is applied to the gate of the auxiliary field-effect transistor 302 which is normally non-conducting but assumes a conductive state during the positive pulses of the composite signal $\delta_c$. Consequently, when the two input signals to the detector cross-multiplier 230 are at the same frequency and are 180° out of phase, the signal transmitted by the auxiliary field-effect transistor 302 from the auxiliary one-shot will have a maximum average value. Furthermore, if a composite signal $\delta_c$ is not being generated (e.g. if terrain conditions do not provide a receivable image signal), the auxiliary field-effect transistor 302 will remain non-conducting.

The quality signal $\bar{\epsilon}'$ is applied as a first input to an "AND" gate 306, while the "0" output of the switching one-shot 268 is applied as a second input to the "AND" gate 306. When both the "0" signal and the quality signal $\bar{\epsilon}'$ are present, the magnitude of the quality signal $\bar{\epsilon}'$ is compared to a quality threshold reference source 308, at a comparator 310. If the quality signal $\bar{\epsilon}'$ falls below the threshold, the comparator 310 generates the memory instruction signal which is applied to the sample-and-hold 282.

Furthermore, since the "AND" gate 306 will not conduct when the "0" signal from the switching one-shot 268 is not present, the memory instruction signal $\alpha$ will be applied to the sample-and-hold 282 when the multivibrator cascade 250 is being reset.

Turning now to FIG. 14, there is shown an image velocity detector according to the present invention, for generating a first detector output signal $\epsilon_{0-1}$ which is proportional to and representative of a first direction component of image velocity, and for generating a second detector output signal $\bar{\epsilon}_{0-2}$ which is proportional to and representative of a second direction component of image velocity. In the third alternative embodiment of FIG. 14, reference numerals preceded by the letter "*a*" are applied to a first set of components similar to those of the preferred mechanization of the composite and reference signal generation apparatus of FIG. 2, while reference numerals preceding the letter "*b*" are applied to a second set of components similar to those of the preferred mechanization. A disc 36″ is similar to the disc of FIG. 2, and includes a motor which is controlled by a servo system (not shown) as in the preferred mechanization.

A first image position with respect to the disc 36″ is established by selecting a component of the image velocity and positioning the first phototransistor **34*a* at that image position. A second image position is established by selecting a second image velocity component and positioning the second phototransistor 34*b* with respect to the disc 36″** such that the disc are between the first and second phototransistors subtends the angle formed by the component directions. In the example of FIG. 14, the image velocity componenth are selected to be perpendicular to each other, so that the disc arc terminated by the positions of the phototransistors subtends a quadrant.

A first composite signal $\delta_{c-1}$ is therefore generated as an input to a first detector signal generator 320, while a second composite signal $\delta_{c-2}$ is generated as an input to the second detector signal generator 322. The first reference signal $\delta_{r-1}$ is similarly generated as an input to the first detector signal generator 320, in accordance with the apparatus of the preferrel mechanization of FIG. 2 (not shown), while a second reference signal $\delta_{r-2}$ is generated as an input to the second detector signal generator 322. It is noted that a separate light source (not shown) is required in the generation of each of the reference signals, with each light source positioned as close as practicable to the image position to which it corresponds.

Each of the detector signal generators 320, 322 is comprised of the apparatus associated with the phase controlled loop 204, of FIG. 9, as well as the eccentricity filter 210 and the final averager 212 shown therein. The detector signal generators 320, 322 may further include the auxiliary apparatus shown in FIG. 10. For example, each of the detector signal generators 320, 322 may be comprised of the combination of apparatus in the mechanization shown in FIG. 11.

The first detector output signal $\bar{\epsilon}_{0-1}$ is therefore generated at the output of the first detector signal generator 320, while the second detector output signal $\bar{\epsilon}_{0-2}$ is generated at the output of the second detector signal generator 322.

In addition to its obvious application as providing bidirectional input signals to image stabilization and image motion compensation apparatus, the dual component image velocity detector of FIG. 14 may be employed in various applications as an aid to aeronautical navigation. For example, aircraft yaw, or deviation from a preferred line of flight by angular motion about the aircraft's vertical axis, may be determined and corrected, as well as the aircraft's lateral velocity due to wind, or drift. In this respect, the dual detector of FIG. 14 may be utilized for "crabbing" the aircraft, or for heading the aircraft into a crosswind to counteract the drift.

For example, FIG. 15 illustrates the navigational problem of an aircraft 324 flying between two points, such as from point A to point B. The preferred line of flight is illustrated by a track vector 326, while the actual direction of the aircraft 324 is affected by a crosswind represented by a wind vector 328. It is apparent that the aircraft must head into the crosswind, represented by a heading vector 330, which describes a "crab" angle $\theta$ with the track 326. The crab angle $\theta$ is a known quantity during flight. In order for the aircraft 324 to follow the track leading to point B, it must be moving in the two component directions described by the wind vector 328 and the heading vector 330. If the dual detector of FIG. 14 is carried by the aircraft such that the first detector output signal $\bar{\epsilon}_{0-1}$ represents the image velocity component parallel to the horizontal axis of the aircraft fore-and-aft, while the second detector output signal $\bar{\epsilon}_{0-2}$ represents the image velocity component perpendicular thereto, the two output signals will be descriptive of the angle $\theta$ since $$\tan \theta = \bar{\epsilon}_{0-2} / \bar{\epsilon}_{0-1}$$

The crab angle $\theta$ may be determined by applying the dual detector output signals $\bar{\epsilon}_{0-1}$, $\bar{\epsilon}_{0-2}$ to a trigonometric servo. The output of the trigometric servo may be a shaft rotation which represents the crab angle $\theta$, or the trigonometric servo output may be a voltage representative and proportional to the crab angle $\theta$. Additionally, an analog to digital converter may be utilized for providing a binary representation of the crab angle $\theta$.

When the output of the trigonometric servo represents the predetermined crab angle, the aircaft will be heading correctly to follow a track leading to point B.

Thus, there has been described in several embodiments apparatus for the detection of image velocities, for image stabilization, and for image velocity analysis. Apparatus according to the present invention has a variety of applications when utilized in an aircraft, with respect to both a direct effect upon optical images and an indirect effect which utilizes image velocity information for navigation purposes. The image stabilization apparatus has particular application in combination with aerial cameras, to compensate for image instability contributed by aircraft velocity relative to the ground, as well as other sources of image instability. The apparatus is characterized both by a high degree of accuracy and by short processing and response times.

Other embodiments of apparatus according to the present invention and modifications of the embodiments herein presented may be developed without departing from the essential characteristics thereof. Accordingly, the invention should be limited only by the scope of the claims appended below.

What is claimed as new is:

1. Apparatus for detecting velocity of an optical image, comprising the combination of:

first means in the optical path for periodically interrupting the image at a rate greater than 10 kHz.;

second means adapted to recive the interrupted image for generating a first electrical signal having a composite frequency including a carrier frequency component corresponding to the rate at which said image is interrupted and an image frequency component corresponding to image velocity;

third means for generating a second electrical signal having a frequency corresponding to said carrier frequency component of said first electrical signal; and fourth means for comparing the frequencies of said first and second electrical signals and for generating an output signal representative of image velocity.

2. Apparatus as in claim 1, above, including fifth means coupled to said fourth means interposed in the optical path in advance of said first means for modulating the velocity of said image in accordance with said output signal, for reducing the velocity of the image to a predetermined value.

3. Apparatus as in claim 1, above, wherein said fourth means include modulator means for modulating said second electrical signal in accordance with said outpult signal, to achieve a predetermined frequency correspondence between the modulated second electrical signal and said first electrical signal.

4. Apparatus for generating a first electrical signal having a composite frequency including an image frequency component corresponding to the velocity of a moving optical image and a carrier frequency component greater than 10 kHz., and for generating a second electrical signal having a frequency greater than 10 kHz. corresponding to the carrier frequency component of the first electrical signal, comprising the combination of:

first means for producing a reference image;

second means for periodically interrupting said reference image at an interruption frequency greater than 10 kHz. determined by and corresponding to the carrier frequency;

third means for periodically interrupting the moving image at said interruption frequency;

fourth means adapted to receive the interrupted moving image for generating the first electrical signal; and fifth means adapted to receive the interrupted reference image for generating the second electrical signal.

5. Apparatus for generating a first electrical signal having a composite frequency including an image frequency component corresponding to the velocity of a moving optical image and a carrier frequency component, and for generating a second electrical signal having a frequency corresponding to the carrier frequency component of the first electrical signal, comprising the combination of:

first means for producing a reference image;

second means for periodically interrupting said reference image at an interruption frequency determined by an corresponding to the carrier frequency;

third means for periodically interrupting the moving image at said interruption frequency;

fourth means adapted to receive the interrupted moving image for generating the first electrical signal;

fifth means adapted to receive the interrupted reference image for generating the second electrical signal; and a phase-controlled loop for comparing the frequencies of said first and second electrical signals and for generating an image velocity analog signal representative of image velocity, the phase controlled loop comprising the combination of:

phase error detector means, having a first input to which said first electrical signal is applied, a second input to which said second electrical signal is applied, and an output, for generating a phase error signal which is a function of the phase difference between said signals at said first and second inputs;

averaging means for averaging said phase error signal to generate the image velocity analog signal; and modulator means, for modulating one of said first and second electrical signals in accordance with the image velocity analog signal, to achieve a predetermined frequency correspondence between the modulated electrical signal and the other electrical signal.

6. Apparatus as in claim 4, above, wherein said means for interrupting include a grid member having alternating opaque and transparent bands interposed in the projection of the moving image upon said fourth means, said grid member adapted to move said bands transversely in a direction substantially parallel to the velocity of the moving image, said grid member being further interposed in the projection of said reference image upon said fifth means.

7. Apparatus as in claim 4, above, wherein said means for interrupting includes a grid member having alternating opaque and transparent bands interposed in the projection of the moving image upon said fourth means, said grid member adapted to move said bands transversely in a direction substantially parallel to a selected component of image velocity, said grid member being further interposed in the projection of said reference image upon said fifth means.

8. Apparatus as in claim 7, above, wherein the moving image is an image of a moving target, and said apparatus further includes means for transmitting the moving image to intercept said grid member at a location thereon where said bands move transversely in a direction substantially parallel to a selected component of image velocity.

9. Apparatus as in claim 4, above, wherein said means for interrupting include a disc comprised of a plurality of alternating opaque and transparent sectors, said disc being adapted to rotate about its center, said disc being interposed in the projection of said reference image upon said fifth means, and interposed in the projection of the moving image upon said fourth means, the moving image intercepting said disc at a location thereon where said sectors move substantially parallel to the velocity of the moving image.

10. Apparatus as in claim 4, above, wherein said means for interrupting include a disc comprised of a plurality of alternating opaque and transparent sectors, said disc being adapted to rotate about its center, said disc being interposed in the projection of said reference image upon said fifth means, and interposed in the projection of the moving image upon said fourth means, the moving image intercepting said disc at a location thereon where said sectors move substantially parallel to a selected component of image velocity.

11. Apparatus as in claim 10, above, wherein the moving image is an image of a moving target, and said apparatus further includes means for transmitting the moving image to intercept said disc at a location thereon where said sectors move substantially parallel to a selected component of image velocity.

12. Apparatus as in claim 4, above, wherein said means for interrupting include a disc comprised of a plurality of alternating opaque and transparent sectors, said disc being adapted to rotate about its center and including motor means for producing rotation thereof, said disc interposed in the projection of said reference image upon said fifth means, and interposed in the projection of the moving image upon said fourth means, the moving image intercepting said disc at a location thereon where said sectors move substantially parallel to a selected component of image velocity;

said second means includes a light source;

said fourth means includes a first photoelectric transducer; and said fifth means includes a second photoelectric transducer.

13. Apparatus as in claim 12, above, further including servo means adapted to receive said second electrical signal and connected to said motor means, for controlling rotational velocity of said disc with respect to said sectors thereon to provide a constant carrier frequency in each of said first and scond electrical signals.

14. Apparatus for generating a first electrical signal having a composite frequency including an image frequency component corresponding to the velocity of a moving optical image and a carrier frequency component, and for generating a second electrical signal having a frequency corresponding to the carrier frequency component of the first electrical signal, comprising the combination of:

first means for producing a reference image;

second means for periodically interrupting said reference image at an interruption frequency determined by and corresponding to the carrier frequency and including a light source;

third means for periodically interrupting the moving image at said interruption frequency;

fourth means including a first photoelectric transducer adapted to receive the interrupted moving image for generating the first electrical signal; and fifth means including a second photoelectric transducer adapted to receive the interrupted reference image for generating the second electrical signal, said means for interrupting including a disc comprised of a plurality of alternating opaque and transparent sectors, said disc being adapted to rotate about its center and including motor means for producing rotation thereof, said disc interposed in the projection of said reference image upon said fifth means, and interposed in the projection of the moving image upon said fourth means, the moving image intercepting said disc at a location thereon where said sectors move substantially parallel to a selected component of image velocity; and further including a phase controlled loop for comparing the frequencies of said first and second electrical signals and for stabilizing the moving image in direction parallel to a selected component of image velocity, the phase controlled loop comprising the combination of:

phase error detector means, having a first input to which said first electrical signal is applied, a second electrical signal is applied, and an output, for generating at said output a phase error signal which is a function of the phase difference between said signals at said first and second inputs;

averaging means for averaging said phase error signal to generate an image velocity analog signal proportional to and representative of the selected component of image velocity; and modulator means, for modulating the velocity of the image in accordance with said image velocity analog signal, thereby correspondingly modulating the phase of said first electrical signal, until the frequency of the modulated first electrical signal is identical to the frequency of said second electrical signal and said phase controlled loop is phase locked.

15. Apparatus as in claim 14, above, wherein said phase error detector is a cross-multiplier.

16. Apparatus as in claim 14, above, wherein said modulator means includes rotatable mirror means for intercepting the moving image prior to its being intercepted by said disc, and control means for controlling rotation of said mirror means in response to said image velocity analog signal, whereby rotation of said mirror means modulates the selected component of image velocity to stabilize the image parallel to the selected component.

17. Apparatus as in claim 16, above, wherein the moving image is an image of a moving target, and said apparatus further includes image generation means for generating the image such that it intercepts said disc at a location thereon where said sectors move substantially parallel to the selected component of image velocity.

18. Apparatus as in claim 17, above, wherein said image generator means includes a lens positioned between said rotatable mirror and said disc.

19. Apparatus as in claim 14, above, further including filter means positioned in said phase controlled loop between said averaging means and said modulator means, for eliminating errors in said image velocity analog signal caused by eccentric rotation of said disc.

20. Apparatus for generating a first electrical signal having a composite frequency including an image frequency component corresponding to the velocity of a moving optical image and a carrier frequency component, and for generating a second electrical signal having a frequency corresponding to the carrier frequency component of the first electrical signal, comprising the combination of:

first means for producing a reference image;
second means for periodically interrupting said reference image at an interruption frequency determined by and corresponding to the carrier frequency and including a light source;
third means for periodically interrupting the moving image at said interruption frequency;
fourth means including a first photoelectric transducer adapted to receive the interrupter moving image for generating the first electrical signal; and
fifth means including a second photoelectric transducer adapted to receive the interrupted reference image for generating the second electrical signal,
said means for interrupting including a disc comprised of a plurality of alternating opaque and transparent sectors, said disc being adapted to rotate about its center and including motor means for producing rotation thereof, said disc interposed in the projection of said reference image upon said fifth means, and interposed in the projection of the moving image upon said fourth means, the moving image intercepting said disc at a location thereon where said sectors move substantially parallel to a selected component of image velocity; and
further including a phase controlled loop for comparing the frequencies of said first and second electrical signals and for generating an image velocity analog signal proportional to and representative of a selected component of image velocity, the phase controlled loop comprising the combination of:
phase modulator means having a first input to which said second electrical signal is applied, a second input to which a modulating signal is applied, and an output, for generating at said output a third electrical signal;
phase error detector means having a first input to which said first electrical signal is applied, a second input to which said third electrical signal is applied, and an output, for generating at said phase error detector output a phase error signal which is a function of the phase difference between said first and third signals;
averaging means having an input connected to said phase error detector means output, and an output, for averaging said phase error signal to generate at said averaging means output said image velocity analog signal;
integrator means having an input connected to said averaging means output, and an output, for integrating said image velocity analog signal, to generate at said integrator output said modulating signal;
whereby, when the frequency of said third electrical signal is identical to the frequency of said first electrical signal and said phase controlled loop is phase locked, said image velocity analog signal is proportional to and representative of the selected component of image velocity.

21. Apparatus as in claim 20, above, wherein said phase error detector means include a cross-multiplier.

22. Apparatus as in claim 20, above, wherein the moving image is an image of a moving target, and said apparatus further includes means for generating said image such that it intercepts said disc at a location thereon where said sectors move substantially parallel to the selected component of image velocity.

23. Apparatus as in claim 22, above, wherein said image generator means is a lens.

24. Apparatus as in claim 20, above, further including filter means having an input connected to said averaging means output and to said integrator means input, and an output for transmitting to said filter output said image velocity analog signal having eliminated therefrom a periodic variation caused by eccentric rotation of said disc.

25. Apparatus as in claim 24, above, further including second averaging means coupled to said filter output, for averaging said image velocity analog signal.

26. Apparatus as in claim 24, above, further including a sample-and-hold network having an input normally connected to said filter output, and an output, for averaging said filter image velocity analog signal and for storing an electrical charge corresponding to the average of the said filtered image velocity analog signal, and for disconnecting said sample-and-hold input from said filter output in response to an applied command signal to provide at said sample-and-hold output an alternate signal generated from said stored electrical charge.

27. Apparatus as in claim 26, above, further including means for montoring said phase controlled loop and for generating said command signal during times when said image velocity analog signal is not proportional to and representative of the selected component of image velocity.

28. In conjunction with a moving image, apparatus for generating a first electrical composite signal having a composite frequency including a first image frequency component corresponding to a selected first component of image velocity and a carrier frequency component, for generating a first electrical reference signal having a frequency corresponding to said carrier frequency, for generating a second electrical composite signal including a second image frequency component corresponding to a selected second component of image velocity and a second carrier frequency component, and for generating a second electrical reference signal having a frequency corresponding to said carrier frequency component of said second electrical cmposite signal, comprising the combination of:

a disc comprised of a plurality of alternating opaque and transparent sectors, said disc adapted to rotate about its center and including motor means for providing rotation thereof, said disc positioned with respect to the image such that the image intercepts said disc at a first location thereon where said sectors move substantially parallel to the selected first component of image velocity, and at a second location thereon where said sectors move substantially parallel to the selected second component of image velocity;
first image transducer means adapted to receive the image after the image is intercepted by said disc at said first disc location, for generating said first electrical composite signal;
a first light source positioned such that flux therefrom intercepts said disc at a location thereon adjacent to said first disc location;
first reference transducer means for receiving said flux from said first light source after being intercepted by said disc, for generating said first electrical reference signal;
second image transducer means adapted to receive said image after the image is intercepted by said disc at said second disc location, for generating said second electrical composite signal;
a second light source positioned such that flux therefrom intercepts said disc at a location thereon adjacent to said second disc location; and
second reference transducer means for receiving said flux from said second light source after being intercepted by said disc, for generating said second electrical reference signal.

29. Apparatus as in claim 28, above, further including servo means adapted to have applied thereto said first electrical reference signal and connected to said motor means, for controlling rotational velocity of said disc with respect to said sectors thereon to provide a constant carrier frequency in each of said composite and reference signals.

30. Apparatus as in claim 28, above, wherein said moving image is an image of a moving target, and said apparatus further includes means for transmitting the moving image such that a first portion of the image intercepts said disc at said first disc location, and a second portion of the image intercepts said disc at said second disc location.

31. Apparatus as in claim 28, above, further including a first phase controlled loop for comparing the frequencies of said first electrical composite signal and said first electrical reference signal to generate a first image velocity analog signal proportional to and representative of the selected first component of image velocity, and a second phase controlled loop for comparing the frequencies of said second electrical composite signal and said second electrical reference signal to generate a second image velocity analog signal proportional to and representative of the selected second component of image velocity, each of said phase controlled loops comprising the separate combination of:

phase modulator means having a first input to which one of said electrical reference signals is applied, a second input to which a modulating signal is applied, and an output, for generating at said output an electrical modulated reference signal;

phase error detector means having a first input to which is applied the one of said electrical composite signals corresponding to said electrical reference signal applied to said phase modulator first input, said phase error detector means having a second input to which said electrical modulated reference signal is applied, and an output, for generating at said phase error detector output a phase error signal which is a function of the phase difference between said electrical composite signal and said electrical modulated reference signal;

averaging means having an input connected to said phase error detector output, and an output, for averaging said phase error signal to generate at said averaging means output one of said image velocity analog signals;

integrator means having an output connected to said averaging means output, and an output, for integrating said image velocity analog signal to generate at said integrator output said modulating signal;

whereby, when the frequency of said electrical modulated reference signal is identical to the frequency of said electrical composite signal in each of said first and second phase controlled loops, and each of said phase controlled loops is phase locked, each of said image velocity analog signals is proportional to and representative of said selected respective component of image velocity.

32. Apparatus as in claim 31, above, wherein the selected second component of image velocity is orthogonal to the selected first component of image velocity.

33. Apparatus as in claim 32, above, further including a trigonometric servo having a first input to which said first image velocity analog signal is applied, a second input to which said second image velocity analog signal is applied, and an output, to generate at said output a signal which is representative of the angle described by one of the selected components of image velocity with the vector summation of both of the selected components of image velocity.

34. Apparatus as in claim 31, above, further including first filter means associated with said first phase controlled loop, and second filter means associated with said second phase controlled loop, each of said filter means having an input connected to its associated phase controlled loop at said averaging means output and at said integrator means input, and an output for transmitting to said filter output said image velocity analog signal corresponding thereto having eliminated therefrom a periodic variation caused by eccentric rotation of said disc.

35. Apparatus as in claim 28, above, wherein said apparatus is adapted to be utilized in a camera having a movable platen for receiving the moving image, and wherein the selected second component of image velocity is orthogonal to the first component of image velocity, and further including image transfer means for transferring a first portion of the image from the platen to said first disc location and for transferring a second portion of the image from the platen to said second disc location.

36. Apparatus as in claim 35, above, wherein said disc said light sources, and said transducer means are adapted to move along with the platen, and further including a first phase controlled loop for comparing the frequencies of said first electrical composite signal and said first electrical reference signal and for stabilizing the moving image in a first direction parallel to the selected first component of image velocity, and a second phase controlled loop for comparing the frequencies of said second electrical composite signal and said second electrical reference signal and for stabilizing the moving image in a second direction parallel to the selected second component of image velocity, each of said phase controlled loops comprising the separate combination of:

phase error detector means, having a first input to which is applied one of said electrical composite signals, a second input to which is applied the one of said electrical reference signals associated with said electrical composite signal applied to said phase error detector first input, and an output, for generating a phase error signal at said output which is a function of the phase difference between said signals at said first and second inputs;

averaging means for averaging said phase error signal to generate a first image velocity analog signal proportional to and representative of the selected component of image velocity associated with said applied electrical composite signal; and modulator means, for modulating said selected component of image velocity in accordance with said image velocity analog signal, thereby correspondingly modulating the phase of said applied electrical composite signal;

whereby, when the frequency of each of the modulated composite signals is identical to the frequency of the associated electrical reference signal, and each of said phase controlled loops is phase locked, said image is stabilized with respect to the platen.

37. Apparatus as in claim 36, above, wherein each of said modulator means includes means for moving the platen in a direction parallel to the selected respective component of image velocity.

38. Apparatus as in claim 36, above, further including separate filter means positioned in each of said phase controlled loops between said averaging means and said modulator means, for eliminating errors in each of said image velocity analog signals caused by eccentric rotation of said disc.

39. In conjunction with image stabilizer apparatus utilizing a phase controlled loop having an input signal and an output signal which are in frequency and phase lock when image stabilization is maximized, auxiliary apparatus for monitoring the quality of performance of the image stabilizer apparatus and for providing an alternate stabilizing signal when the quality of performance falls below a threshold value, said auxiliary apparatus comprising the combination of:

phase shifter means having an input to which is applied one of said loop input and output signals, and an output, for generating at said phase shifter output a signal similar to said phase shifter input signal but shifted in phase by an amount by which the phase of said loop input and output signals would be separated if said loop were in frequency and phase lock;

auxiliary phase error detector means, having a first input to which is applied the other of said loop input and output signals, a second input to which is applied said phase shifter output signal, and an output for generating at said output an auxiliary phase error signal which is a function of the phase difference between said signals at said auxiliary phase error detector first and second inputs;

auxiliary averaging means for averaging said auxiliary phase error signal to generate a quality signal proportional to and representative of the quality of performance of said image stabilizer apparatus;

a reference source for generating a reference signal corresponding to said threshold value;

comparator means, having a first input to which is applied said quality signal and an output, for generating at said comparator output a switching signal when the magnitude of said quality signal falls below said threshold value;

an alternate image stabilizer source, for generating an alternate image stabilizer signal; and switch means normally closing said loop, for opening said loop and making contact between said alternate image stabilizer source and said image stabilizer apparatus upon application of said switching signal.

40. Apparatus as in claim 39, above further including means for restoring said switch means to its normal position at selected times.

41. In conjunction with image stabilizer apparatus utilizing a phase controlled loop having an input signal and an output signal which are in frequency and phase lock where image stabilization is maximized, and the phase controlled loop further including a sawtooth comparator for phase error detection having a first input signal which is identical to the phase controlled loop input signal and a second input signal which is identical to the phase controlled loop output signal, auxiliary apparatus for monitoring the quality of performance of the image stabilizer apparatus and for providing an alternate stabilizing signal when the quality of performance falls below a threshold value, said auxiliary apparatus comprising the combination of:

auxiliary phase error detector means, having a first input to which is applied one of said loop input and output signals, a second input to which is applied the other of said input and output signals, and an output, for generating at said output an auxiliary phase error signal which is a function of the phase difference between said signals at said auxiliary phase error detector first and second inputs;

auxiliary averaging means for averaging said auxiliary phase error signal to generate a quality signal proportional to and representative of the quality of performance of the image stabilizer apparatus;

a reference source for generating a reference signal corresponding to said threshold value;

comparator means having a first input to which is applied said reference signal, a second input to which is applied said quality signal, and an output, for generating at said comparator output a switching signal when the magnitude of said quality signal falls below said threshold value;

an alternate image stabilizer source, for generating an alternate image stabilizer signal; and switch means normally closing said loop, for opening said loop and making contact between said alternate image stabilizer source and said image stabilizer apparatus upon application of said switching signal.

42. Apparatus as in claim 41, above further including means for restoring said switch means to its normal position at selected times.

43. In conjunction with image velocity detector apparatus for generating an image velocity output signal at a detector output terminal, the detector apparatus utilizing a phase controlled loop having an input signal and an output signal which are in frequency and phase lock when the image velocity output signal is proportional to and representative of a selected component of image velocity, auxiliary apparatus for monitoring the quality of performance of the detector apparatus and for providing an alternate output signal when the quality of performance falls below a threshold value, said auxiliary apparatus comprising the combination of:

phase shifter means having an input to which is applied one of said loop input and output signals, and an output, for generating at said phase shifter output a signal similar to said phase shifter input signal but shifted in phase an amount by which the phases of said loop input and output signals would be separated if said loop were in frequency and phase lock;

auxiliary phase error detector means, having a first input to which is applied the other of said loop input and output signals, a second input to which is applied said phase shifter output signal, and an output, for generating at said output an auxiliary phase error signal which is a function of the phase difference between said signals at said auxiliary phase error detector first and second inputs;

auxiliary averaging means for averaging said auxiliary phase error signal to generate a quality signal proportional to and representative of the quality of performance of the detector apparatus;

a reference source for generating a reference signal corresponding to said threshold values;

comparator means, having a first input to which is applied said reference signal, a second input to which is applied said quality signal, and an output for generating at said comparator output a switching signal when the magnitude of said quality signal falls below said threshold value;

an alternate detector output source, for generating an alternate output signal which is approximately proportional to and representative of said selected component of image velocity; and switch means normally connecting said detector output terminal to said detector apparatus such that said image velocity output signal is normally applied thereto, for disconnecting the detector output terminal from the detector apparatus and for connecting the detector output terminal to said alternate detector output source upon application of said switching signal.

44. Apparatus as in claim 43, above, wherein said detector output terminal, said alternate detector output source, and said switch means are combined in a sample-and-hold network.

45. In conjunction with image velocity detector apparatus for generating an image velocity output signal at a detector output terminal, the detector apparatus utilizing a phase controlled loop having an input signal and an output signal which are in frequency and phase lock when the image velocity output signal is proportional to and representative of a selected component of image velocity, the phase controlled loop further including a sawtooth comparator for phase error detection having a first input signal identical to the phase controlled loop input signal and a second input signal identical to the phase controlled loop output signal, auxiliary apparatus for monitoring the quality of performance of the detector apparatus and for providing an alternate output signal when the quality of performance falls below a threshold value, said auxiliary apparatus comprising the combination of:

auxiliary phase error detector means, having a first input to which is applied one of the loop input and output signals, a second input to which is applied the other of the loop input and output signals, and an output, for generating at said output an auxiliary phase error signal which is a function of the phase difference between said signals at said auxiliary phase error detector first and second inputs;

auxiliary averaging means for averaging said auxiliary phase error signal to generate a quality signal proportional to and representative of the quality of performance of the detector apparatus;

a reference source for generating a reference signal corresponding to said threshold value;

comparator means, having a first input to which is applied said reference signal, a second input to which is applied said quality signal, and an output for generating at said comparator output a switching signal when the magnitude of said quality signal falls below said threshold values;

an alternate detector output source, for generating an alternate output signal which is approximately proportional to and representative of the selected component of image velocity; and switch means normally connecting the detector output terminal to said detector apparatus such that the image velocity output signal is normally applied thereto, for disconnecting the detector output terminal from said detector apparatus and for connecting the detector output terminal to said alternate detector output source upon application of said switching signal.

46. Apparatus as in claim 45, above, wherein said detector output terminal, said alternate detector output source, and said switch means are combined in a sample-and-hold network.

References Cited

UNITED STATES PATENTS

| | | | |
|---|---|---|---|
| 2,772,479 | 12/1956 | Doyle | 95—12.5 |
| 2,961,545 | 11/1960 | Astheim et al. | 250—233 X |
| 2,967,247 | 1/1961 | Turck | 250—233 X |
| 2,972,928 | 2/1961 | Maurer | 95—12.5 X |
| 3,088,033 | 4/1963 | Kauzold | 250—233 X |
| 3,229,101 | 1/1966 | Chitayat | 250—233 X |

ARCHIE R. BORCHELT, Primary Examiner

C. M. LEEDOM, Assistant Examiner

U.S. Cl. X.R.

95—12.5; 250—233; 356—28